United States Patent
Ikoshi et al.

(10) Patent No.: US 8,740,368 B2
(45) Date of Patent: Jun. 3, 2014

(54) INK COMPOSITION, INK SET AND INKJET IMAGE FORMING METHOD

(75) Inventors: Masao Ikoshi, Kanagawa (JP); Jun Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 255 days.

(21) Appl. No.: 13/047,819

(22) Filed: Mar. 15, 2011

(65) Prior Publication Data

US 2011/0227995 A1    Sep. 22, 2011

(30) Foreign Application Priority Data

Mar. 18, 2010   (JP) ................. 2010-063142

(51) Int. Cl.
*B41J 2/205*    (2006.01)
(52) U.S. Cl.
USPC ............................................................ 347/98
(58) Field of Classification Search
None
See application file for complete search history.

(56) References Cited

U.S. PATENT DOCUMENTS

| | | | |
|---|---|---|---|
| 5,948,512 A | 9/1999 | Kubota et al. | |
| 6,232,370 B1 | 5/2001 | Kubota et al. | |
| 6,485,138 B1 | 11/2002 | Kubota et al. | |
| 2008/0241398 A1 | 10/2008 | Kato et al. | |
| 2009/0232989 A1 | 9/2009 | Tojo | |

FOREIGN PATENT DOCUMENTS

| | | |
|---|---|---|
| JP | 62121776 A | 6/1987 |
| JP | 9-286940 | 11/1997 |
| JP | 11-34478 | 2/1999 |
| JP | 11-105415 | 4/1999 |
| JP | 2002-206063 A | 7/2002 |
| JP | 2005-023102 A | 1/2005 |
| JP | 2006-321875 | 11/2006 |
| JP | 2009-221253 | 10/2009 |

OTHER PUBLICATIONS

Partial English language translation of the following: Office action dated May 28, 2013 from the Japanese Patent Office in a Japanese patent application corresponding to the instant patent application.
Corresponding Chinese Office Action (Application No. 201110072702.7) issued Dec. 9, 2013 with the Partial English Translation thereof.

*Primary Examiner* — Lamson Nguyen

(74) *Attorney, Agent, or Firm* — SOLARIS Intellectual Property Group, PLLC

(57) ABSTRACT

The present invention provides an ink composition for inkjet recording, containing colloidal silica, urea, a coloring material, and water.

13 Claims, 2 Drawing Sheets

INK COMPOSITION, INK SET AND INKJET IMAGE FORMING METHOD

CROSS-REFERENCE TO RELATED APPLICATION

This application claims priority under 35 USC 119 from Japanese Patent Application No. 2010-063142, filed on Mar. 18, 2010, the disclosure of which is incorporated by reference herein.

BACKGROUND

1. Field of the Invention

The present invention relates to an ink composition, an ink set, and an inkjet image forming method.

2. Related Art

In recent years, as a result of ever-increasing demand for the protection of resources, the protection of the environment, the enhancement of operational stability, and the like, the conversion of inks into aqueous products is advancing. As in the case of oil-based inks, the qualities required in aqueous inks include fluidity, storage stability, glossiness of film, clarity, coloring ability, and the like. However, compared to oil-based vehicles, most pigments have a markedly poor adaptability to aqueous vehicles with respect to pigment dispersibility and the like and therefore, satisfactory quality cannot be obtained by conventional dispersion methods. The use of various additives, for example, aqueous pigment dispersion resins or surfactants, has hitherto been studied, but an aqueous ink that satisfies all the adaptation properties described above and is comparable to existing high quality oil-based inks has not been obtained.

In order to solve these problems, for example, an aqueous ink composition containing a pigment and colloidal silica has been disclosed (see, for example, Japanese Patent Application Laid-Open (JP-A) No. 2002-206063). Further, an ink composition containing a resin emulsion and an inorganic oxide colloid has been disclosed (see, for example, JP-A No. 2005-23102), and it is described that a good image can be formed.

SUMMARY

The present invention has been made in view of the above circumstances and provides an ink composition for inkjet recording, containing colloidal silica, urea, a coloring material, and water.

BRIEF DESCRIPTION OF THE DRAWINGS

Exemplary embodiments of the present invention will be described in detail, based on the following figures, wherein.

DETAILED DESCRIPTION OF THE INVENTION

Figure 1:
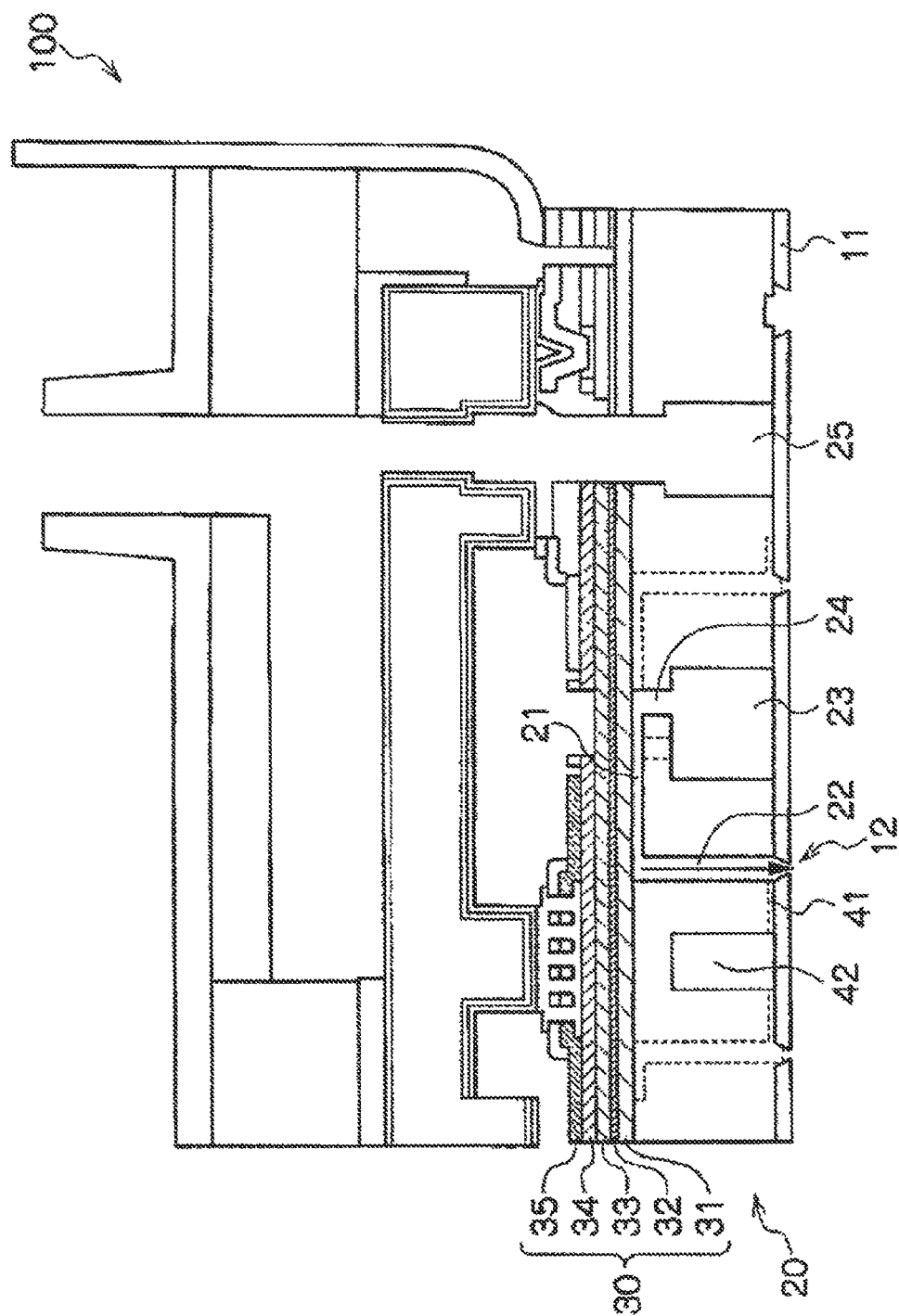
FIG. 1 is a schematic sectional diagram showing one example of an internal structure of an inkjet head.

When the ink composition described in JP-A No. 2002-206063 is used, it can hardly be said that the ink composition is satisfactory in view of maintenance properties or ejectability. Further, when an ink composition contains polymer particles as the aqueous ink composition described in JP-A No. 2005-23102, there are cases in which maintenance property is deteriorated or liquid repellency of a liquid repellent film in an inkjet head member lowers.

The present invention provides an ink composition for inkjet recording, which exhibits excellent maintenance properties and in which lowering of liquid repellency of an inkjet head member is suppressed, an ink set including the ink composition, and an inkjet image forming method.

According to the present invention, an ink composition for inkjet recording, which exhibits excellent maintenance properties and in which lowering of liquid repellency of an inkjet head member is suppressed, an ink set including the ink composition, and an inkjet image forming method may be provided.

<Ink Composition for Inkjet Recording>

The ink composition for inkjet recording (hereinafter, may be merely referred to as the "ink composition") of the present invention is configured to include at least one kind of colloidal silica, urea, at least one kind of coloring material, and water, and, if necessary, other components.

When an ink composition having such configuration is used, excellent maintenance properties may be realized, and lowering of liquid repellency of an inkjet head member may be suppressed.

In general, liquid repellency is imparted to the member that constructs the inkjet head in order to maintain the ink ejection performance. This liquid repellency can be imparted, for example, by processing the member surface using a fluorine-containing surface finishing agent. It is known that the liquid repellency of the inkjet head member gradually lowers when the inkjet head is used over a long period of time.

Alternatively, there is a case in which a nozzle plate is configured to include silicone or the like in order to precisely form especially fine nozzles (discharge ports). Also in the inkjet head equipped with such a silicone nozzle plate, there are cases in which the lowering of liquid repellency of the nozzle plate exerts adverse influence on the ink ejectability.

The ink composition for inkjet recording of the present invention can suppress the lowering of liquid repellency of the inkjet head member more effectively, even in the case of using an inkjet head equipped with such a nozzle plate formed from silicone or the like.

According to the usage conditions, components included in an ink may adhere to an inkjet head or the like, thereby causing lowering of ink ejectability. Therefore, there are cases in which maintenance for removing the adhered ink components is performed. Since the ink composition of the present invention has a configuration as described above, the adhered ink components may exhibit good removability and thus, the ink composition may exhibit excellent maintenance properties.

[Colloidal Silica]

Colloidal silica is colloid that includes fine particles of inorganic oxides containing silicon, in which an average particle diameter of the fine particles is several hundred nm or less. Colloidal silica includes silicon dioxide (including hydrates thereof) as a main component and may contain aluminate as a minor component. Examples of the aluminate, which may be incorporated as a minor component, include sodium aluminate and potassium aluminate.

Further, an inorganic salt such as sodium hydroxide, potassium hydroxide, lithium hydroxide, or ammonium hydroxide, or an organic salt such as tetramethylammonium hydroxide may be incorporated in the colloidal silica. The inorganic salt or the organic salt functions, for example, as a stabilizer of colloid.

The dispersing medium for colloidal silica is not particularly limited and may be any of water, an organic solvent, or a mixture of water and an organic solvent. The organic solvent may be a water-soluble organic solvent or a non-water-soluble organic solvent. However, the organic solvent is preferably a water-soluble organic solvent. Specific examples thereof may include methanol, ethanol, isopropyl alcohol, and n-propanol.

There is no particular limitation on the method for producing colloidal silica, and colloidal silica can be produced by a conventionally used method. For example, colloidal silica can be produced through an Aerosil synthesis by thermal decomposition of silicon tetrachloride, or may be produced from water glass. Alternatively, colloidal silica can be produced according to a liquid phase synthesis method including hydrolysis of an alkoxide (see, for example, "Seni to Kogyo (Fiber and Industry)", vol. 60, No. 7, page 376, 2004), or the like.

There is no particular limitation on the average particle diameter of the particles included in the colloidal silica according to the present invention. For example, the average particle diameter may be set from 1 nm to 200 nm. The average particle diameter is preferably from 1 nm to 100 nm, more preferably from 3 nm to 50 nm, even more preferably from 3 nm to 25 nm, and particularly preferably from 5 nm to 20 nm.

When the average particle diameter is 200 nm or less, damages (for example, lowering of liquid repellency or the like) caused by ink to the members which construct the inkjet head, for example, a substrate, a protective film, a liquid repellent film, or the like, may be more effectively suppressed. It is thought that, by making the average particle diameter smaller, the total surface area of particles increases and as a result, damages to the members which construct the inkjet head are more effectively suppressed. Moreover, it is preferable that the average particle diameter of the particles is 200 nm or less, also from the viewpoints of the ejectability of the ink composition and suppression of the abrasive effect caused by the particles. Further, when the average particle diameter is 1 nm or more, productivity may be enhanced, and colloidal silica that exhibits a smaller dispersion in performance may be obtained.

In the present invention, the average particle diameter of the colloidal silica is represented by a volume average particle diameter. The volume average particle diameter can be determined according to a general method for dispersed particles such as a light scattering method or a laser diffraction method.

The shape of the colloidal silica is not particularly limited so long as it does not disturb the ejection performance of the ink. For example, the shape of the colloidal silica may be a spherical shape, a long shape, a needle-like shape, or a shape like a string of beads. Above all, it is preferred that the colloidal silica is spherical, from the viewpoint of ejectability of the ink.

The colloidal silica, which can be used in the present invention, may be produced by the production method described above, or may be a commercially available product. Specific examples of the commercially available product may include LUDOX AM, LUDOX AS, LUDOX LS, LUDOX TM, and LUDOX HS (all trade names, manufactured by E.I. Du Pont de Nemours & Co.); SNOWTEX S, SNOWTEX XS, SNOWTEX 20, SNOWTEX 30, SNOWTEX 40, SNOWTEX N, SNOWTEX C, and SNOWTEX O (all trade names, manufactured by Nissan Chemical Industries, Ltd.); SYTON C-30 and SYTON ZOO (all trade names, manufactured by Monsanto Co.); NALCOAG-1060 and NALCOAG-ID21 to 64 (all trade names, manufactured by Nalco Chem. Co.); METHANOL SOL, IPA SOL, MEK SOL, and TOLUENE SOL (all trade names, manufactured by Fuso Chemical Co., Ltd.), CATALOID-S, CATALOID-F120, CATALOID SI-350, CATALOID SI-500, CATALOID SI-30, CATALOID S-20L, CATALOID S-20H, CATALOID S-30L, CATALOID S-30H, CATALOID SI-40, and OSCAL-1432 (isopropyl alcohol sol) (all trade names, manufactured by JGC Catalysts and Chemicals Ltd.); ADELITE (trade name, manufactured by Asahidenka Co., Ltd.); and, as examples of colloidal silica in the shape of a string of beads, SNOWTEX ST-UP, SNOWTEX PS-S, SNOWTEX PS-M, SNOWTEX ST-OUP, SNOWTEX PS-SO, and SNOWTEX PS-MO (all trade names, manufactured by Nissan Chemical Industries, Ltd.). These products are easily available.

The pH of the above commercially available colloidal silica dispersion liquid is often adjusted to the pH of acidic or alkaline. This is because the region where colloidal silica is stably dispersed exists in an acidic side or alkaline side. In the case of adding a commercially available colloidal silica dispersion liquid to the ink composition, the pH of the region where the colloidal silica is stably dispersed and the pH of the ink composition should be taken in consideration.

The content of the colloidal silica in the ink composition of the present invention is not particularly limited. For example, the content of the colloidal silica can be set from 0.0001% by mass to 10% by mass of the total amount of the ink composition. The content of the colloidal silica is preferably from 0.01% by mass to 3.0% by mass of the total amount of the ink composition, more preferably from 0.02% by mass to 0.5% by mass of the total amount of the ink composition, and particularly preferably from 0.03% by mass to 0.2% by mass of the total amount of the ink composition. When the content of the colloidal silica in the ink composition is equal to or less than the upper limit described above, the ejectability of the ink composition may be further enhanced, and the influence of the abrasive effect on the inkjet head caused by the silica particles may be more effectively suppressed. Further, when the content is equal to or greater than the lower limit described above, the lowering of liquid repellency of the inkjet head member may be more effectively suppressed.

Moreover, it is preferable that the ink composition of the present invention contains colloidal silica having a volume average particle diameter of from 3 nm to 25 nm in an amount of from 0.01% by mass to 3% by mass of the total amount of the ink composition, from the viewpoints of suppression of the lowering of liquid repellency of the inkjet head member and the ink ejectability. It is more preferable that the ink composition contains colloidal silica having a volume average particle diameter of from 5 nm to 20 nm in an amount of from 0.03% by mass to 0.2% by mass of the total amount of the ink composition.

[Urea]

The ink composition of the present invention contains urea. Urea has a high moisture retention capability, and therefore can effectively suppress undesired drying or solidification of ink, as a solid moistening agent. Further, in the present invention, incorporation of urea in addition to the colloidal silica described above may result in further effective improvement in maintenance properties of the inkjet head and the like.

The content of the urea in the ink composition of the invention is preferably from 1% by mass to 20% by mass, more preferably from 1% by mass but lower than 15% by mass, and even more preferably from 3% by mass to 10% by mass, from the viewpoints of improvement in maintenance properties (removability by wiping off) and the like.

In the ink composition of the invention, the ratio of the content of the urea to the content of the colloidal silica is not particularly limited, but the content ratio of the urea relative to the colloidal silica (urea/colloidal silica) is preferably from 5 to 1000, more preferably from 10 to 500, and even more preferably from 20 to 200.

There is no particular limitation concerning the combination of the content of the urea and the content of the colloidal silica. However, from the viewpoint of more effectively achieving both the removability by wiping off and image fixability, the following combinations are preferable.

Namely, it is preferable that the content of the urea is 1.0% by mass or more and the content of the colloidal silica is 0.01% by mass or more. It is more preferable that the content of the urea is from 1.0% by mass to 20% by mass and the content of the colloidal silica is from 0.02% by mass to 0.5% by mass. Further, it is particularly preferable that the content of the urea is from 3.0% by mass to 10% by mass and the content of the colloidal silica is from 0.03% by mass to 0.2% by mass.

(Solid Moistening Agent)

The ink composition of the present invention may further contain a solid moistening agent other than the urea. In the present invention, the term "solid moistening agent" refers to a water-soluble compound which has a function of water retention and is solid at 25° C.

As the solid moistening agent that can be used in the present invention, a general solid moistening agent for use in an aqueous ink composition, as it is, can be utilized. Specific examples thereof include urea derivatives, saccharides, sugar alcohols, hyaluronic acids, trimethylolpropane, and polyhydric alcohols such as 1,2,6-hexanetriol.

Examples of the urea derivatives include compounds obtained by substituting a hydrogen atom on the nitrogen of urea with an alkyl group or an alkanol group, thiourea, and compounds obtained by substituting a hydrogen atom on the nitrogen of thiourea with an alkyl group or an alkanol group. The alkyl groups on the nitrogen atom of urea or thiourea may link together to form a ring.

Specific examples of the urea derivatives include N,N-dimethylurea, thiourea, ethyleneurea, hydroxyethylurea, hydroxybutylurea, ethylenethiourea, and diethylthiourea.

Examples of the saccharides include monosaccharides, disaccharides, oligosaccharides (including trisaccharides and tetrasaccharides), and polysaccharides. Specific examples thereof include glucose, mannose, fructose, ribose, xylose, arabinose, galactose, aldonic acid, glucitol, maltose, cellobiose, lactose, sucrose, trehalose, and maltotriose. As used herein, the term "polysaccharides" refers to sugars in a broad sense, and encompasses substances widely spread in nature, such as alginic acid, α-cyclodextrin, and cellulose. Examples of derivatives of the saccharides include reducing sugars (for example, sugar alcohols) of the above saccharides, and oxidized sugars (for example, aldonic acid, uronic acid, amino acid, thiosugars, and the like) of the above saccharides. In particular, sugar alcohols are preferable, and specific examples thereof include maltitol, sorbitol, and xylitol. As hyaluronic acids, for example, a product that is commercially available under the name of SODIUM HYALURONATE 1% AQUEOUS SOLUTION (molecular weight of 350,000) may be used.

[Coloring Material]

The ink composition of the present invention contains at least one coloring material. As the coloring material, a known dye, pigment, or the like can be used without any particular limitation. Above all, a coloring material which is substantially insoluble or slightly soluble in water is preferable, from the viewpoint of ink coloring property. Specific examples of such coloring material may include various pigments, disperse dyes, oil-soluble dyes, and dyes that form J-aggregates. It is more preferable that the coloring material is a pigment.

In the present invention, a water-insoluble pigment itself or a pigment, which has been subjected to a surface treatment with a dispersant, itself, can be used as the coloring material.

The pigment that may be used in the invention is not particularly limited in its kind, and any of conventionally known organic pigments and inorganic pigments may be used. Examples of the pigment that may be used include organic pigments such as polycyclic pigments, such as azo lake, an azo pigment, a phthalocyanine pigment, a perylene pigment, a perinone pigment, an anthraquinone pigment, a quinacridone pigment, a dioxazine pigment, diketopyrrolopyrrole pigment, a thioindigo pigment, an isoindolinone pigment, and a quinophthalone pigment; dye lakes, such as basic dye type lake and acidic dye type lake; nitro pigments; nitroso pigments; aniline black; and daylight fluorescent pigments; and inorganic pigments such as titanium oxide, an iron oxide type pigment, and a carbon black type pigment. Even a pigment that is not described in Color Index can be used so long as it is capable of being dispersed in an aqueous phase. Moreover, those obtained by subjecting the above pigments to a surface treatment with a surfactant, a polymer dispersant, or the like; graft carbon; or the like can also be used. Among the above pigments, particularly, an azo pigment, a phthalocyanine pigment, an anthraquinone pigment, a quinacridone pigment, or a carbon black type pigment is preferably used.

Specific examples of the pigment which can be used in the invention include the pigments described in paragraphs [0142] to [0145] of JP-A No. 2007-100071.

It is enough that the pigment can stably exist in the ink composition however, the pigment is preferably a water-dispersing pigment from the viewpoints of light fastness, dispersion stability, and the like.

Specific examples of the water-dispersing pigment include the following pigments (1) to (4).

(1) An encapsulated pigment: that is a polymer emulsion formed by incorporating a pigment in polymer particles. More specifically, the encapsulated pigment is formed by coating at least a part of a pigment surface with a water-insoluble resin to impart hydrophilicity to the pigment by a polymer layer on the pigment surface so that the coated pigment is dispersible in water.

(2) A self-dispersing pigment: that is a pigment which has at least one type of hydrophilic group on its surface and exhibits water dispersibility in the absence of a dispersant. More specifically, the self-dispersing pigment is formed by subjecting a pigment, mainly carbon black or the like, to a surface oxidation treatment to impart hydrophilicity to the pigment so that the treated pigment alone is dispersible in water.

(3) A resin-dispersed pigment: that is a pigment dispersed by a water-soluble polymer compound having a weight average molecular weight of 50,000 or less.

(4) A surfactant-dispersed pigment: that is a pigment dispersed by a surfactant.

In the present invention, preferable examples of the water-dispersing pigment may include the (1) encapsulated pigment and the (2) self-dispersing pigment, and particularly preferable examples may include the (1) encapsulated pigment.

(Encapsulated Pigment)

The coloring material in the present invention is preferably a pigment (an encapsulated pigment) in which at least a part of a surface thereof is coated with a water-insoluble resin.

The water-insoluble resin (hereinafter, may be referred to as a "dispersant" or a "water-insoluble resin dispersant") is a water-insoluble polymer. The water-insoluble resin is not particularly limited as long as the water-insoluble resin can disperse a pigment, and a conventionally known water-insoluble resin can be used. The water-insoluble resin can be configured to include, for example, both a hydrophobic constituent unit and a hydrophilic constituent unit.

Examples of a monomer that forms the hydrophobic constituent unit may include a styrene type monomer, alkyl (meth)acrylate, and an aromatic group-containing (meth) acrylate.

The monomer that forms the hydrophilic constituent unit is not particularly limited as long as the monomer contains a hydrophilic group. Examples of the hydrophilic group may include a nonionic group, a carboxy group, a sulfonic acid group, and a phosphoric acid group.

The hydrophilic constituent unit in the invention preferably contains at least a carboxy group from the viewpoint of dispersion stability, and an embodiment in which the hydrophilic constituent unit contains both a nonionic group and a carboxy group is also preferable.

Specific examples of the water-insoluble resin dispersant include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, and a styrene-maleic acid copolymer.

Here, the term "(meth)acrylic acid" means acrylic acid or methacrylic acid.

In the present invention, from the viewpoint of dispersion stability of the pigment, the water-insoluble resin dispersant is preferably a vinyl polymer containing a carboxy group, and more preferably a vinyl polymer having at least a constituent unit derived from an aromatic-group containing monomer as the hydrophobic constituent unit and a constituent unit containing a carboxy group as the hydrophilic constituent unit.

The weight average molecular weight of the water-insoluble resin dispersant is preferably from 3,000 to 200,000, more preferably from 5,000 to 100,000, even more preferably from 5,000 to 80,000, and particularly preferably from 10,000 to 60,000, from the viewpoint of the dispersion stability of the pigment.

The content of the dispersant in the encapsulated pigment according to the present invention is preferably from 5% by mass to 200% by mass with respect to the pigment, from the viewpoints of dispersibility of the pigment, ink coloring property, and dispersion stability. The content of the dispersant is more preferably from 10% by mass to 100% by mass, and particularly preferably from 20% by mass to 80% by mass with respect to the pigment.

When the content of the dispersant in the encapsulated pigment is within the above range, the pigment may be coated with an appropriate amount of dispersant and thus, an encapsulated pigment having a small particle diameter and excellent stability over time may tend to be easily obtained, which is preferable.

The encapsulated pigment in the invention may include other dispersant, in addition to the above water-insoluble resin dispersant. For example, a conventionally known water-soluble low molecular weight dispersant, a water-soluble polymer, or the like may be used. The content of the dispersant other than the above water-insoluble resin dispersant may be within the above range of the content of the dispersant.

Other additives such as a basic substance (a neutralizing agent) or a surfactant may be added to the encapsulated pigment, as necessary.

As the basic substance, a neutralizing agent (an organic base or an inorganic alkali) can be used. The basic substance is added for the purpose of neutralizing the dispersant, and the amount of the basic substance to be added is preferably such that the pH of the composition containing the dispersant is adjusted to be from 7 to 11, and more preferably such that the pH of the composition is adjusted to be from 8 to 10.

The content of the basic substance is preferably from 50 mol % to 150 mol %, more preferably from 70 mol % to 120 mol %, and particularly preferably from 80 mol % to 100 mol %, with respect to 100 mol % of the ionic group in the dispersant.

Specific examples of the basic substance include those described below in the description of self-dispersing polymer particles.

—Method for Producing Pigment Dispersion—

The encapsulated pigment in the present invention can be obtained as a pigment dispersion by, for example, dispersing a mixture including a pigment, a dispersant and, as necessary, a solvent (preferably, an organic solvent), and the like by using a disperser.

The pigment dispersion in the present invention is preferably produced by a method including mixing a pigment, a dispersant, an organic solvent which dissolves or disperses the dispersant, and a solution containing a basic substance and water as a main component (a mixing and hydration process) and then, removing the organic solvent from the resulting mixture (a solvent removal process).

By this method for producing a pigment dispersion, a particle dispersion in which the encapsulated pigment is finely dispersed and which has excellent storage stability can be produced.

It is necessary that the organic solvent in the method for producing a pigment dispersion can dissolve or disperse the dispersant according to the invention. In addition, it is preferable that the organic solvent has a certain degree of affinity to water. Specifically, an organic solvent having a solubility in water at 20° C. of from 10% by mass to 50% by mass is preferable.

More specifically, the particle dispersion in the invention can be produced by a production method including the following process (1) and process (2), but the present invention is not limited thereto.

Process (1): A process of dispersing a pigment, a dispersant, and an organic solvent which dissolves or disperses the dispersant, with a mixture containing a basic substance and water.

Process (2): A process of removing at least a portion of the organic solvent from the resulting mixture that has been subjected to the dispersion treatment.

In process (1) above, first, the dispersant is dissolved or dispersed in an organic solvent to obtain a mixture (a mixing process). Subsequently, a pigment, a solution containing a basic substance and water as a main component, water, and as necessary, a surfactant or the like are added to the mixture and mixed, and the resulting mixture is dispersed to obtain an oil-in-water type pigment dispersion.

The addition amount of the basic substance (degree of neutralization) is not particularly limited. Concerning the liquid properties of the finally obtained encapsulated pigment dispersion, usually, it is preferable that the encapsulated pigment dispersion is almost neutral, for example, the pH (at 25° C.) is from 4.5 to 10. The value of pH may also be determined according to the desired degree of neutralization of the dispersant.

The pigment, the dispersant, and the other additives used in the method for producing the pigment dispersion each have the same definitions as those described above in the section of encapsulated pigment, respectively, and so are the preferable examples.

Preferable examples of the organic solvent that may be used in the invention include alcohol solvents, ketone solvents, and ether solvents. Specifically, examples of the alcohol solvents include ethanol, isopropanol, n-butanol, t-butanol, isobutanol, and diacetone alcohol. Examples of the ketone solvents include acetone, methyl ethyl ketone, diethyl ketone, and methyl isobutyl ketone. Examples of the ether solvents include dibutyl ether, tetrahydrofuran, and dioxane. Among these solvents, isopropanol, acetone, and methyl ethyl ketone are preferable, and methyl ethyl ketone is particularly preferable.

Further, these organic solvents may be used alone or in a combination of two or more of them.

In the production of the pigment dispersion, kneading and dispersion treatment may be carried out while applying strong shear force by using a twin roll, a triple roll, a ball mill, a thoron mill, a Disper, a kneader, a co-kneader, a homogenizer, a blender, a single-screw extruder, a twin-screw extruder, or the like.

Details on kneading and dispersion are described in, for example, "Paint Flow and Pigment Dispersion" written by T. C. Patton (published by John Wily and Sons, Inc., 1964).

Further, as necessary, in the production of the pigment dispersion, fine dispersion treatment with beads which have a particle diameter of from 0.01 mm to 1 mm and are made of glass, zirconia, or the like, using a vertical or horizontal sand grinder, a pin mill, a slit mill, an ultrasonic disperser, or the like may be performed.

In the method for producing the pigment dispersion according to the invention, the method of removing the organic solvent is not particularly limited, and the organic solvent can be removed by a known method such as distillation under reduced pressure.

The encapsulated pigment in the pigment dispersion thus obtained may maintain a good dispersion state, and the obtained pigment dispersion may exhibit excellent stability over time.

(Self-Dispersing Pigment)

A self-dispersing pigment is a pigment formed by bonding many hydrophilic functional groups and/or salts thereof (hereinafter, referred to as "dispersibility imparting groups") to a surface of the pigment directly or indirectly through an alkyl group, an alkyl ether group, an aryl group, or the like, to be made dispersible in an aqueous medium without using a dispersant. Herein, the expression "dispersible in an aqueous medium without using a dispersant" refers to a state of being possible to be dispersed in an aqueous medium without using a dispersant for dispersing the pigment.

Since an ink including the self-dispersing pigment as a colorant does not need to further include such a dispersant that is included for dispersing general pigments as described above, it is easy to prepare an ink in which foam formation due to the lowering of antifoaming property caused by the dispersant scarcely occurs and which has excellent ejection stability.

In the present invention, self-dispersing pigments, which have been subjected to a surface treatment by an oxidation treatment using hypohalogenous acid and/or hypohalogenite or by an oxidation treatment using ozone, may be described as preferable examples. It is possible to utilize commercially available products as the self-dispersing pigment. Examples of the commercially available products include MICROJET CW-1 (trade name, manufactured by Orient Chemical Co., Ltd.) and CAB-O-JET 200 and CAB-O-JET 300 (all trade names, manufactured by Cabot Oil & Gas Corp.).

In the present invention, the average particle diameter of the pigment is preferably from 10 nm to 200 nm, more preferably from 10 nm to 150 nm, and even more preferably from 10 nm to 100 nm. When the average particle diameter is 200 nm or less, color reproducibility may become satisfactory, and droplet ejection properties may become satisfactory in the case of an inkjet method. When the particle diameter is 10 nm or more, lightfastness may become satisfactory.

Further, the particle diameter distribution of the pigment is not particularly limited, and may be any of a broad particle diameter distribution or a monodispersed particle diameter distribution. Two or more types of pigments each having a monodispersed particle diameter distribution may also be used by mixing them.

The average particle diameter and particle diameter distribution of the pigment can be measured using, for example, a dynamic light scattering method.

In the ink composition of the present invention, one of the pigments may be used alone, or two or more of them may be used in combination.

The content of the pigment in the ink composition is preferably from 0.1% by mass to 25% by mass, more preferably from 1% by mass to 20% by mass, even more preferably from 1.5% by mass to 15% by mass, and particularly preferably from 1.5% by mass to 10% by mass, with respect to the ink composition, from the viewpoint of image density.

In the ink composition of the invention, the mass ratio of the colloidal silica to the water-insoluble resin (colloidal silica/water-insoluble resin) is preferably from 0.0001 to 0.5, more preferably from 0.0001 to 0.3, and even more preferably from 0.001 to 0.05, from the viewpoints of dispersion stability of the ink and suppression of the lowering of liquid repellency of the inkjet head member.

Moreover, it is preferable that the ink composition of the invention contains a water-insoluble resin having an acid value of from 30 mgKOH/g to 100 mgKOH/g and at least one type of the above colloidal silica, in which the mass ratio thereof (colloidal silica/water-insoluble resin) is from 0.0001 to 0.3, from the viewpoints of dispersion stability of the ink, ejection reliability, light fastness and rub resistance of the image formed, and suppression of the lowering of liquid repellency of the inkjet head member. It is more preferable that the ink composition of the invention contains a water-insoluble resin having an acid value of from 50 mgKOH/g to 85 mgKOH/g and at least one type of colloidal silica having a volume average particle diameter of 20 nm or less, in which the mass ratio thereof is from 0.001 to 0.05.

[Hydrophilic Organic Solvent]

The ink composition of the present invention contains a water-based medium. The water-based medium contains at least water as a solvent, but preferably contains water and at least one type of hydrophilic organic solvent. The hydrophilic solvent can be used as an anti-drying agent, a wetting agent, a permeation accelerator, or the like.

An anti-drying agent or a wetting agent is used for the purpose of preventing clogging of nozzles caused by drying of an ink for inkjet recording at an ink spray orifice. The anti-drying agent or the wetting agent is preferably a hydrophilic organic solvent having a vapor pressure lower than that of water.

Furthermore, for the purpose of well permeating the ink composition for inkjet recording into paper, a hydrophilic organic solvent is preferably used as a permeation accelerator.

The anti-drying agent can effectively prevent the clogging of nozzles which may possibly be generated by drying of an ink at an ink spray orifice. Further, the anti-drying agent is preferably a hydrophilic organic solvent having a vapor pressure lower than that of water.

Specific examples of the anti-drying agent include polyhydric alcohols such as those represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower alkyl ethers of polyhydric alcohol such as ethylene glycol monomethyl ether, ethylene glycol monoethyl ether, diethylene glycol monomethyl ether, diethylene glycol monoethyl ether, triethylene glycol monoethyl ether, and triethylene glycol monobutyl ether; heterocycles such as 2-pyrrolidone, N-methyl-2-pyrrolidone, 1,3-dimethyl-2-imidazolidinone, and N-ethylmorpholine; sulfur-containing compounds such as sulfolane, dimethylsulfoxide, and 3-sulfolene; polyfunctional compounds such as diacetone alcohol and diethanolamine; and urea derivatives. Among them, polyhydric alcohols such as glycerin and diethylene glycol are preferable as the anti-drying agent. The above anti-drying agents may be used alone or in a combination of two or more of them. It is preferable that the anti-drying agent is contained in the ink composition in an amount of from 10% by mass to 50% by mass.

The permeation accelerator is preferably used for the purpose of well permeating the ink composition into a recording medium (for example, printing paper or the like).

Specific examples of the permeation accelerator that may preferably be used include alcohols such as ethanol, isopropanol, butanol, diethylene glycol monobutyl ether, triethylene glycol monobutyl ether, and 1,2-hexanediol; sodium lauryl sulfate; sodium oleate; and nonionic surfactants. When the permeation accelerator is contained in the ink composition in an amount of from 5% by mass to 30% by mass, a sufficient effect may be exhibited. Further, the permeation accelerator is preferably used within the range of the addition amount such that bleeding of a print and print-through are not generated.

Moreover, the hydrophilic organic solvent can be used for the purpose of adjusting the viscosity, besides the above purposes. Specific examples of the hydrophilic organic solvent that can be used for adjusting the viscosity include alcohols (for example, methanol, ethanol, propanol, isopropanol, butanol, isobutanol, sec-butanol, t-butanol, pentanol, hexanol, cyclohexanol, or benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, or thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, or ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, or tetramethylpropylenediamine), and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, or acetone).

In the ink composition for inkjet recording of the invention, one of the hydrophilic organic solvents may be used alone, or two or more of the hydrophilic organic solvents may be used by mixing them. The content of the hydrophilic organic solvent is preferably from 1% by mass to 60% by mass, more preferably from 5% by mass to 40% by mass, and particularly preferably from 10% by mass to 30% by mass, from the viewpoints of stability and ejectability.

Further, the addition amount of water used in the present invention is not particularly limited, but the content of water in the ink composition for inkjet recording is preferably from 10% by mass to 99% by mass, more preferably from 30% by mass to 80% by mass, and particularly preferably from 50% by mass to 70% by mass, from the viewpoint of ensuring stability and ejection reliability.

[Resin Particles]

The ink composition of the present invention preferably contains at least one type of resin particles from the viewpoints of fixability, rub resistance, and aggregation property. The resin particles are preferably self-dispersing polymer particles including a constituent unit derived from a hydrophilic monomer and a constituent unit derived from a hydrophobic monomer.

The self-dispersing polymer in the present invention refers to a water-insoluble polymer which can get into a dispersed state in an aqueous medium due to the functional group (particularly, an acidic group or a salt thereof) of the polymer itself, when brought into a dispersed state by a phase inversion emulsification method in the absence of a surfactant.

Here, the scope of the term "dispersed state" includes both an emulsified state (emulsion) in which a water-insoluble polymer in the liquid state is dispersed in an aqueous medium, and a dispersed state (suspension) in which a water-insoluble polymer in the solid state is dispersed in an aqueous medium.

With regard to the self-dispersing polymer according to the invention, it is preferable that the water-insoluble polymer is a self-dispersing polymer which can get into a dispersed state in which the polymer is dispersed in the solid state, from the viewpoint of ink fixability when contained in an ink composition.

A phase inversion emulsification method may be used as a method of achieving an emulsified state or dispersed state of the self-dispersing polymer, that is, a method of preparing an aqueous dispersion of the self-dispersing polymer. The phase inversion emulsification method may be, for example, a method including dissolving or dispersing the self-dispersing polymer into a solvent (for example, a hydrophilic organic solvent or the like); subsequently introducing the obtained liquid directly into water without adding a surfactant; stirring and mixing the resulting liquid in a state in which the salt-forming groups (for example, acidic groups) possessed by the self-dispersing polymer are neutralized; and removing the solvent so as to obtain an aqueous dispersion that has been brought into an emulsified state or dispersed state.

A stable emulsified state or dispersed state of the self-dispersing polymer according of the invention means that even when a solution prepared by dissolving 30 g of a water-insoluble polymer in 70 g of an organic solvent (for example, methyl ethyl ketone), a neutralizing agent capable of neutralizing 100% of the salt-forming groups of the water-insoluble polymer (sodium hydroxide if the salt-forming group is anionic, or acetic acid if the salt-forming group is cationic), and 200 g of water are mixed and stirred (apparatus: a stirring apparatus equipped with a stirring blade, at a rotation rate of 200 rpm, for 30 minutes, at 25° C.), and then the organic solvent is removed from the mixture liquid, the emulsified state or dispersed state remains stable for at least one week at 25° C., so that generation of precipitates cannot be verified by visual observation.

The stability of the emulsified state or dispersed state of the self-dispersing polymer can be verified also by an accelerated sedimentation test involving centrifugal separation. The stability in the accelerated sedimentation test involving centrifugal separation can be evaluated by, for example, adjusting the aqueous dispersion of the polymer particles obtained by the method described above to have a solids concentration of 25% by mass, subsequently centrifuging the resulting aqueous dispersion at 12,000 rpm for one hour, and then measuring the solids concentration of a supernatant obtained after the centrifugal separation.

When the ratio of the solids concentration after centrifugal separation to the solids concentration before centrifugal separation is large (a value close to 1), it means that sedimentation of the polymer particles due to centrifugal separation does not occur; in other words, the aqueous dispersion of the polymer particles is more stable. In the present invention, the ratio of the solids concentration after centrifugal separation to the solids concentration before centrifugal separation is preferably 0.8 or higher, more preferably 0.9 or higher, and particularly preferably 0.95 or higher.

The term "water-insoluble polymer" as used herein refers to a polymer that shows an amount of dissolution of 10 g or less when the polymer is dried at 105° C. for 2 hours and then dissolved in 100 g of water at 25° C. The amount of dissolution is preferably 5 g or less, and more preferably 1 g or less. The amount of dissolution is a value when the polymer is neutralized with sodium hydroxide or acetic acid to 100% in accordance with the kind of the salt-forming group of the water-insoluble polymer.

In the self-dispersing polymer according to the present invention, the content of water-soluble components that exhibit water solubility when the self-dispersing polymer is in a dispersed state is preferably 10% by mass or less, more preferably 8% by mass or less, and even more preferably 6% by mass or less. When the content of the water-soluble components is 10% by mass or less, swelling of the polymer particles or fusion between the polymer particles may be effectively suppressed, and a more stable dispersion state can be maintained. Furthermore, an increase in viscosity of the ink composition can be suppressed, and the ejection stability may become better.

Here, the term "water-soluble components" refers to compounds that are contained in the self-dispersing polymer and that dissolve in water in a case in which the self-dispersing polymer is in a dispersed state. The water-soluble components are water-soluble compounds that are generated as by-products or incorporated during the production of the self-dispersing polymer.

There is no particular limitation on the glass transition temperature of the self-dispersing polymer in the invention. The glass transition temperature is, however, preferably 120° C. or higher, more preferably from 120° C. to 250° C., more preferably from 150° C. to 250° C., and more preferably from 160° C. to 200° C. When the glass transition temperature is 120° C. or higher, blocking resistance (particularly, under high temperature and high humidity conditions) of the images formed may be enhanced. Further, when the glass transition temperature is 250° C. or lower, rub resistance of the images may be enhanced.

The glass transition temperature of the self-dispersing polymer can be controlled as appropriate in accordance with a conventionally used method. For example, the glass transition temperature of the self-dispersing polymer can be adjusted to be within a desired range by appropriately selecting the kinds of the polymerizable groups of monomers that form the self-dispersing polymer, the kinds of the substituents on the monomers, the constituent ratio of the monomers, the molecular weight of the polymer molecule, and the like.

In the present invention, a measured Tg that is obtained by actual measurement is applied to the glass transition temperature (Tg) of the self-dispersing polymer. Specifically, the measured Tg means a value measured under general measurement conditions using a differential scanning calorimeter (DSC) EXSTAR6220 (trade name, manufactured by SII Nanotechnology, Inc.).

The self-dispersing polymer according to the invention includes at least one type of hydrophilic constituent unit derived from a hydrophilic monomer and at least one type of hydrophobic constituent unit derived from a hydrophobic monomer. The main chain skeleton of the self-dispersing polymer is not particularly limited, but is preferably a vinyl polymer, and more preferably a (meth)acrylic polymer, from the viewpoint of dispersion stability of the polymer particles. The term "(meth)acrylic polymer" as used herein refers to a polymer containing at least one of a constituent unit derived from a methacrylic acid derivative or a constituent unit derived from an acrylic acid derivative.

(Hydrophilic Constituent Unit)

The hydrophilic constituent unit in the invention is not particularly limited as long as the hydrophilic constituent unit is derived from a hydrophilic group-containing monomer (hydrophilic monomer). The hydrophilic constituent unit may be derived from one hydrophilic group-containing monomer, or may be derived from two or more hydrophilic group-containing monomers. The hydrophilic group is not particularly limited, and may be a dissociative group or a nonionic hydrophilic group.

In the present invention, the hydrophilic group is preferably such that at least one is a dissociative group, and more preferably an anionic dissociative group, from the viewpoint of acceleration of self dispersion and from the viewpoint of the stability of the formed emulsified state or dispersed state. Examples of the anionic dissociative group include a carboxy group, a phosphoric acid group, and a sulfonic acid group. Among them, a carboxy group is particularly preferable from the viewpoint of fixability when an ink composition includes the self-dispersing polymer.

The hydrophilic group-containing monomer in the invention is preferably a dissociative group-containing monomer, and more preferably a dissociative group-containing monomer having a dissociative group and an ethylenically unsaturated bond, from the viewpoint of self-dispersibility.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-(methacryloyloxy)methyl succinate. Specific examples of the unsaturated sulfonic acid monomer include styrenesulfonic acid, 2-acrylamido-2-methylpropanesulfonic acid, 3-sulfopropyl(meth)acrylate, and bis(3-sulfopropyl)itaconate. Specific examples of the unsaturated phosphoric acid monomer include vinylphosphonic acid, vinyl phosphate, bis(methacryloyloxyethyl)phosphate, diphenyl-2-(acryloyloxy)ethyl phosphate, diphenyl-2-(methacryloyloxy)ethyl phosphate, and dibutyl-2-(acryloyloxy)ethyl phosphate.

Among the above dissociative group-containing monomers, an unsaturated carboxylic acid monomer is preferable, and at least one of acrylic acid or methacrylic acid is more preferable, from the viewpoints of dispersion stability and ejection stability.

Examples of the monomer having a nonionic hydrophilic group include ethylenically unsaturated monomers containing a (poly)ethyleneoxy group or a polypropyleneoxy group such as 2-methoxyethyl acrylate, 2-(2-methoxyethoxy)ethyl acrylate, 2-(2-methoxyethoxy)ethyl methacrylate, ethoxytriethylene glycol methacrylate, methoxypolyethylene glycol (molecular weight of from 200 to 1000) monomethacrylate, and polyethylene glycol (molecular weight of from 200 to 1000) monomethacrylate; and ethylenically unsaturated monomers having a hydroxy group such as hydroxymethyl (meth)acrylate, 2-hydroxyethyl(meth)acrylate, 2-hydroxypropyl(meth)acrylate, 4-hydroxybutyl(meth)acrylate, hydroxypentyl(meth)acrylate, and hydroxyhexyl(meth)acrylate.

The monomer having a nonionic hydrophilic group is preferably an ethylenically unsaturated monomer which has alkyl ether at the end, rather than an ethylenically unsaturated monomer which has a hydroxy group at the end, from the viewpoints of stability of the particles and the content of the water-soluble components.

With regard to the hydrophilic constituent unit according to the invention, an embodiment in which the self-dispersing polymer contains only a hydrophilic constituent unit having an anionic dissociative group, or an embodiment in which the self-dispersing polymer contains both a hydrophilic constituent unit having an anionic dissociative group and a hydrophilic constituent unit having a nonionic hydrophilic group, is preferable.

Furthermore, an embodiment in which the self-dispersing polymer contains two or more types of hydrophilic constituent units having an anionic dissociative group, or an embodiment in which the self-dispersing polymer contains two or more of the hydrophilic constituent unit having an anionic dissociative group and hydrophilic constituent unit having a nonionic hydrophilic group in combination, is also preferable.

The content of the hydrophilic constituent unit in the self-dispersing polymer is preferably 25% by mass or lower, more preferably from 1% by mass to 25% by mass, even more preferably from 2% by mass to 23% by mass, and particularly preferably from 4% by mass to 20% by mass, from the viewpoints of the viscosity and stability over time.

In a case in which the self-dispersing polymer has two or more types of hydrophilic constituent units, it is preferable that the total content of the hydrophilic constituent units is within the above range.

The content of the hydrophilic constituent unit having an anionic dissociative group in the self-dispersing polymer is preferably such that the acid value falls in the suitable range described below.

The content of the constituent unit having a nonionic hydrophilic group is preferably from 0% by mass to 25% by mass, more preferably from 0% by mass to 20% by mass, and particularly preferably from 0% by mass to 15% by mass, from the viewpoints of ejection stability and stability over time.

In a case in which the self-dispersing polymer has an anionic dissociative group, the acid value thereof (in terms of mgKOH/g) is preferably from 20 to 200, more preferably from 22 to 120, and even more preferably from 25 to 100, from the viewpoints of self-dispersibility, the content of water-soluble components, and fixability when an ink composition includes the self-dispersing polymer. The acid value is particularly preferably from 30 to 80. When the acid value is 20 or more, the particles can be dispersed more stably, and when the acid value is 200 or less, the amount of the water-soluble components can be reduced.

(Hydrophobic Constituent Unit)

The hydrophobic constituent unit according to the invention is not particularly limited as long as the hydrophobic constituent unit is derived from a hydrophobic group-containing monomer (hydrophobic monomer). The hydrophobic constituent unit may be derived from one hydrophobic group-containing monomer or may be derived from two or more hydrophobic group-containing monomers. The hydrophobic group is not particularly limited, and may be any of a chain aliphatic group, a cyclic aliphatic group, or an aromatic group.

In the present invention, from the viewpoints of blocking resistance, rub resistance, and dispersion stability, it is preferable that at least one of the hydrophobic monomers is a cyclic aliphatic group-containing monomer, and it is more preferable that at least one of the hydrophobic monomers is a cyclic aliphatic group-containing (meth)acrylate (hereinafter, may be referred to as an "alicyclic(meth)acrylate").

—Alicyclic(Meth)Acrylate—

As used in the invention, the term "alicyclic(meth)acrylate" refers to a compound which includes a structural moiety derived from (meth)acrylic acid and a structural moiety derived from an alcohol, in which the structural moiety derived from an alcohol has a structure including at least one unsubstituted or substituted alicyclic hydrocarbon group (cyclic aliphatic group). Note that, the alicyclic hydrocarbon group may be the structural moiety derived from an alcohol itself, or may be bonded to the structural moiety derived from an alcohol through a linking group.

The term "alicyclic(meth)acrylate" means a methacrylate or acrylate having an alicyclic hydrocarbon group.

The alicyclic hydrocarbon group is not particularly limited as long as it contains a cyclic non-aromatic hydrocarbon group. Examples thereof include a monocyclic hydrocarbon group, a bicyclic hydrocarbon group, and a polycyclic hydrocarbon group having three or more rings.

Specific examples of the alicyclic hydrocarbon group include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalene group, a perhydrofluorenyl group, a tricyclo[5.2.1.0$^{2,6}$]decanyl group, and bicyclo[4.3.0]nonyl group.

The alicyclic hydrocarbon group may further have a substituent. Examples of the substituent include an alkyl group, an alkenyl group, an aryl group, an aralkyl group, an alkoxy group, a hydroxy group, a primary amino group, a secondary amino group, a tertiary amino group, an alkylcarbonyl group, an arylcarbonyl group, and a cyano group.

Further, the alicyclic hydrocarbon group may form a condensed ring.

In the alicyclic hydrocarbon group according to the invention, the alicyclic hydrocarbon group portion preferably has from 5 to 20 carbon atoms, from the viewpoints of the viscosity and solubility.

Preferable examples of the linking group that links the alicyclic hydrocarbon group and the structural moiety derived from an alcohol include an alkylene group, an alkenylene group, an alkynylene group, an arylalkylene group, an alkyleneoxy group, a monoethyleneoxy group, an oligoethyleneoxy group, a monopropyleneoxy group, and an oligopropyleneoxy group, each of which has from 1 to 20 carbon atoms.

Specific examples of the alicyclic(meth)acrylate according to the invention include the following compounds; however, the present invention is not limited to these specific examples.

Specific examples of monocyclic(meth)acrylates include cycloalkyl(meth)acrylates in which the cycloalkyl group has from 3 to 10 carbon atoms, such as cyclopropyl(meth)acrylate, cyclobutyl(meth)acrylate, cyclopentyl(meth)acrylate, cyclohexyl(meth)acrylate, cycloheptyl(meth)acrylate, cyclooctyl(meth)acrylate, cyclononyl(meth)acrylate, and cyclodecyl(meth)acrylate.

Specific examples of bicyclic(meth)acrylates include isobornyl(meth)acrylate and norbornyl(meth)acrylate.

Specific examples of tricyclic(meth)acrylates include adamantyl(meth)acrylate, dicyclopentanyl(meth)acrylate, and dicyclopenetenyloxyethyl(meth)acrylate.

These alicyclic(meth)acrylates may be used alone or in a combination of two or more of them.

Among them, at least one of a bicyclic(meth)acrylate or a polycyclic(meth)acrylate having three or more rings is preferable, and at least one selected from the group consisting of isobornyl(meth)acrylate, adamantyl(meth)acrylate, and dicyclopentanyl(meth)acrylate is more preferable, from the viewpoints of the dispersion stability of the self-dispersing polymer particles, fixability, and blocking resistance.

In the present invention, the content of the constituent units derived from an alicyclic(meth)acrylate contained in the self-dispersing polymer particle is preferably from 20% by mass to 90% by mass, and more preferably from 40% by mass to 90% by mass, from the viewpoints of the stability of the self-dispersed state, stabilization of particle shape in an aqueous medium due to the hydrophobic interaction between the alicyclic hydrocarbon groups, and reduction in the amount of water-soluble components due to an appropriate degree of hydrophobization of the particles. The content is particularly preferably from 50% by mass to 80% by mass.

When the content of the constituent units derived from an alicyclic(meth)acrylate is 20% by mass or higher, fixability and blocking resistance can be improved. When the content of the constituent units derived from an alicyclic(meth)acrylate is 90% by mass or lower, the stability of the polymer particles may be improved.

The self-dispersing polymer in the invention may further include, as necessary, an additional constituent unit as the hydrophobic constituent unit, in addition to the constituent unit derived from an alicyclic(meth)acrylate. The monomer that forms the additional constituent unit is not particularly limited as long as it is a monomer which is copolymerizable with the alicyclic(meth)acrylate and the hydrophilic group-containing monomer described above, and any known monomer can be used.

Specific examples of the monomer that forms the additional constituent unit (hereinafter, may be referred to as "additional copolymerizable monomer") include alkyl(meth)acrylates such as methyl(meth)acrylate, ethyl(meth)acrylate, isopropyl(meth)acrylate, n-propyl(meth)acrylate, n-butyl(meth)acrylate, isobutyl(meth)acrylate, t-butyl(meth)acrylate, hexyl(meth)acrylate, and ethylhexyl(meth)acrylate; aromatic ring-containing (meth)acrylates such as benzyl(meth)acrylate and phenoxyethyl(meth)acrylate; styrenes such as styrene, α-methylstyrene, and chlorostyrene; dialkylaminoalkyl(meth)acrylates such as dimethylaminoethyl(meth)acrylate; (meth)acrylamides such as N-hydroxyalkyl(meth)acrylamides such as N-hydroxymethyl(meth)acrylamide, N-hydroxyethyl(meth)acrylamide, and N-hydroxybutyl(meth)acrylamide; and N-alkoxyalkyl(meth)acrylamides such as N-methoxymethyl(meth)acrylamide, N-ethoxymethyl(meth)acrylamide, N-(n-, iso-)butoxymethyl(meth)acrylamide, N-methoxyethyl(meth)acrylamide, N-ethoxyethyl(meth)acrylamide, and N-(n-, iso-)butoxyethyl(meth)acrylamide.

Above all, the monomer that forms the additional constituent unit is preferably at least one (meth)acrylate containing a chain alkyl group having from 1 to 8 carbon atoms, more preferably a (meth)acrylate containing a chain alkyl group having from 1 to 4 carbon atoms, and particularly preferably methyl(meth)acrylate or ethyl(meth)acrylate, from the viewpoint of the flexibility of the polymer skeleton or ease of control of the glass transition temperature (Tg), and from the viewpoint of the dispersion stability of the self-dispersing polymer. Here, the term "chain alkyl group" refers to an alkyl group having a straight chain or a branched chain.

In the present invention, a (meth)acrylate containing an aromatic group can also be preferably used.

In a case in which an aromatic group-containing (meth)acrylate is contained as the additional copolymerizable monomer, the content of the constituent unit derived from the aromatic group-containing (meth)acrylate is preferably 40% by mass or lower, more preferably 30% by mass or lower, and particularly preferably 20% by mass or lower, from the viewpoint of the dispersion stability of the self-dispersing polymer particles.

Further, in a case in which a styrene type monomer is used as the additional copolymerizable monomer, the content of the constituent unit derived from the styrene type monomer is preferably 20% by mass or lower, more preferably 10% by mass or lower, and even more preferably 5% by mass or lower, from the viewpoint of the stability when the self-dispersing polymer is made into particles. It is particularly preferable that the self-dispersing polymer does not contain a constituent unit derived from a styrene type monomer.

Here, the term "styrene type monomer" encompasses styrene, substituted styrenes (for example, α-methylstyrene, chlorostyrene, or the like), and styrene macromers having a polystyrene structural unit.

In the present invention, one type of the additional copolymerizable monomers may be used alone or two or more types of them may be used in combination.

In a case in which the self-dispersing polymer contains the additional constituent unit, the content of the additional constituent unit is preferably from 10% by mass to 80% by mass, more preferably from 15% by mass to 75% by mass, and particularly preferably from 20% by mass to 70% by mass. When two or more types of monomers that form the additional constituent units are used in combination, the total content of the additional constituent units is preferably within the above range.

The self-dispersing polymer in the invention is preferably a polymer obtained by polymerization using at least three types of monomers including an alicyclic(meth)acrylate, an additional copolymerizable monomer, and a hydrophilic group-containing monomer, and more preferably a polymer obtained by polymerization using at least three types of monomers including an alicyclic(meth)acrylate, an alkyl group-containing (meth)acrylate having a straight chain or branched chain having from 1 to 8 carbon atoms, and a hydrophilic group-containing monomer, from the viewpoint of the dispersion stability.

In the present invention, from the viewpoint of the dispersion stability, it is preferable that the self-dispersing polymer does not substantially include a constituent unit containing a substituent having high hydrophobicity, which is derived from a (meth)acrylate having a straight chain or branched alkyl group having 9 or more carbon atoms, an aromatic group-containing macromonomer, or the like. An embodiment in which the self-dispersing polymer does not include the above constituent unit containing a substituent having high hydrophobicity at all is more preferable.

The self-dispersing polymer in the invention may be a random copolymer in which the respective constituent units are introduced irregularly, or a block copolymer in which the respective constituent units are introduced regularly. In a case in which the self-dispersing polymer is a block copolymer, the block copolymer may be synthesized by introducing the respective constituent units in any order, and the same constituent component may be used more than once. However, the self-dispersing polymer is preferably a random copolymer in view of versatility and productivity.

The molecular weight range of the self-dispersing polymer in the invention, in terms of weight average molecular weight, is preferably from 3,000 to 200,000, and more preferably from 10,000 to 200,000, and even more preferably from 30,000 to 150,000. When the weight average molecular weight is 3,000 or more, the amount of water-soluble components can be effectively reduced. When the weight average molecular weight is 200,000 or less, the self dispersion stability can be enhanced.

Note that, the weight average molecular weight can be measured by gel permeation chromatography (GPC).

From the viewpoint of controlling the hydrophilicity and hydrophobicity of the polymer, it is preferable that the self-dispersing polymer in the invention is a vinyl polymer which contains a structure derived from an alicyclic(meth)acrylate at a copolymerization ratio of from 20% by mass to 90% by mass, and at least one of a structure derived from a dissociative group-containing monomer or a structure derived from a (meth)acrylate containing a chain alkyl group having from 1 to 8 carbon atoms, and has an acid value of from 20 to 120, a total content of the hydrophilic structural units of 25% by mass or lower, and a weight average molecular weight of from 3,000 to 200,000.

It is more preferable that the self-dispersing polymer in the invention is a vinyl polymer which contains a structure derived from a bicyclic(meth)acrylate or a polycyclic(meth)acrylate having three or more rings at a copolymerization ratio of 20% by mass or higher but lower than 90% by mass, a structure derived from a (meth)acrylate containing a chain alkyl group having from 1 to 4 carbon atoms at a copolymerization ratio of 10% by mass or higher but lower than 80% by mass, and a structure derived from a carboxy group-containing monomer so as to give an acid value in a range of from 25 to 100, and has a total content of the hydrophilic structural units of 25% by mass or lower and a weight average molecular weight of from 10,000 to 200,000.

Moreover, it is particularly preferable that the self-dispersing polymer in the invention is a vinyl polymer which contains a structure derived from a bicyclic(meth)acrylate or a polycyclic(meth)acrylate having three or more rings at a copolymerization ratio of 40% by mass or higher but lower than 80% by mass, a structure derived from at least methyl (meth)acrylate or ethyl(meth)acrylate at a copolymerization ratio of 20% by mass or higher but lower than 60% by mass, and a structure derived from acrylic acid or methacrylic acid so as to give an acid value in a range of from 30 to 80, and has a total content of the hydrophilic structural units of 25% by mass or lower and a weight average molecular weight of from 30,000 to 150,000.

Specific examples of the self-dispersing polymer are shown below as exemplary compounds; however, the present invention is not limited thereto. The numbers in the parentheses represent the mass ratio of the copolymerized components.

Methyl methacrylate/isobornyl methacrylate/methacrylic acid copolymer (20/72/8), glass transition temperature: 180° C.

Methyl methacrylate/isobornyl methacrylate/methacrylic acid copolymer (40/52/8), glass transition temperature: 160° C.

Methyl methacrylate/isobornyl methacrylate/methacrylic acid copolymer (50/44/6), glass transition temperature: 140° C.

Methyl methacrylate/isobornyl methacrylate/methacrylic acid copolymer (85/7/8), glass transition temperature: 120° C.

Methyl methacrylate/benzyl methacrylate/methacrylic acid copolymer (85/7/8), glass transition temperature: 100° C.

Methyl methacrylate/dicyclopentanyl methacrylate/methacrylic acid copolymer (20/72/8), glass transition temperature: 160° C.

Methyl methacrylate/isobornyl methacrylate/dicyclopentanyl methacrylate/methacrylic acid copolymer (20/62/10/8), glass transition temperature: 170° C.

The method for producing the self-dispersing polymer according to the present invention is not particularly limited, and the self-dispersing polymer may be produced through copolymerization using a monomer mixture in accordance with a known polymerization method. Among such polymerization methods, a method in which polymerization is carried out in an organic solvent is preferable, and a solution polymerization method is particularly preferable, from the viewpoint of droplet ejection stability when an ink composition includes the self-dispersing polymer.

In the method for producing the self-dispersing polymer according to the invention, the water-insoluble polymer described above can be produced by performing copolymerization under an inert gas atmosphere, using a mixture including a monomer mixture and, as necessary, an organic solvent and a radical polymerization initiator.

The method for producing an aqueous dispersion of the self-dispersing polymer particles according to the invention is not particularly limited, and an aqueous dispersion of self-dispersing polymer particles can be produced by a known method. A process of obtaining the self-dispersing polymer as an aqueous dispersion is preferably a phase inversion emulsification method including the following process (1) and process (2).

Process (1): A process of stirring a mixture containing a water-insoluble polymer, an organic solvent, a neutralizing agent, and an aqueous medium, to obtain a dispersion.

Process (2): A process of removing at least a portion of the organic solvent from the resulting dispersion.

The above process (1) is preferably a process in which, first, the water-insoluble polymer is dissolved in an organic solvent, then a neutralizing agent and an aqueous medium are gradually added thereto, and mixed by stirring to obtain a dispersion. By thus adding a neutralizing agent and an aqueous medium to the water-insoluble polymer solution in which the water-insoluble polymer has been dissolved in an organic solvent, self-dispersing polymer particles having a particle diameter to achieve higher storage stability can be obtained without requiring a strong shear force.

The method of stirring the mixture is not particularly limited, and a generally used mixing and stirring apparatus, or if necessary, a disperser such as an ultrasonic disperser or a high-pressure homogenizer may be used.

Preferable examples of the organic solvent include alcohol solvents, ketone solvents, and ether solvents.

Examples of the alcohol solvents include isopropyl alcohol, n-butanol, t-butanol, and ethanol. Examples of the ketone solvents include acetone, methyl ethyl ketone, diethyl ketone, and methyl isobutyl ketone. Examples of the ether solvents include dibutyl ether and dioxane. Among these organic solvents, ketone solvents such as methyl ethyl ketone and alcohol solvents such as isopropyl alcohol are preferable.

Further, it is also preferable to use isopropyl alcohol and methyl ethyl ketone in combination. When these solvents are used in combination, aggregation precipitation or fusion between the particles may not occur, and thus, self-dispersing polymer particles which have a fine particle diameter and exhibit high dispersion stability can be obtained. It can be thought that the reason for this is because, for example, the polarity change at the time of phase conversion from an oil system to an aqueous system becomes mild.

The neutralizing agent is used for partially or entirely neutralizing the dissociative groups so that the self-dispersing polymer forms a stable emulsified state or dispersed state in water. In a case in which the self-dispersing polymer has an anionic dissociative group as the dissociative group, examples of the neutralizing agent that may be used include basic compounds such as an organic amine compound, ammonia, and an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxide include lithium hydroxide, sodium hydroxide, and potassium hydroxide. Among them, sodium hydroxide, potassium hydroxide, triethylamine, and triethanolamine are preferable from the viewpoint of the stabilization of dispersion of the self-dispersing polymer particles according to the invention into water.

The amount of the basic compound used is preferably from 5 mol % to 120 mol %, more preferably from 20 mol % to 100 mol %, and even more preferably from 30 mol % to 80 mol %, with respect to 100 mol % of dissociative groups. When the amount of the basic compound is 15 mol % or more, the effect of stabilizing the dispersion of particles in water may be exhibited. When the amount of the basic compound is 80 mol % or less, the effect of reducing the amount of water-soluble components may be obtained.

In the above process (2), an aqueous dispersion of self-dispersing polymer particles can be obtained by distilling off the organic solvent from the dispersion obtained in the above process (1) using a common method such as distillation under reduced pressure, whereby phase conversion into an aqueous system occurs. The organic solvent in the obtained aqueous dispersion is substantially removed, and the amount of the remaining organic solvent is preferably 0.2% by mass or less, and more preferably 0.1% by mass or less.

The average particle diameter of the resin particles according to the invention is preferably in a range of from 1 nm to 100 nm, more preferably from 3 nm to 80 nm, and even more preferably from 5 nm to 60 nm. The average particle diameter is particularly preferably from 5 nm to 40 nm. When the average particle diameter is 1 nm or more, production suitability may be enhanced. When the average particle diameter is 100 nm or less, storage stability may be enhanced.

Further, the particle diameter distribution of the resin particles is not particularly limited. The resin particles may have a broad particle diameter distribution or a monodispersed particle diameter distribution. Two or more water-insoluble polymers may also be used as a mixture.

The average particle diameter and particle diameter distribution can be measured using, for example, a light scattering method.

In the ink composition of the present invention, the resin particles preferably exist in a form that does not substantially contain a colorant.

The resin particles in the present invention have excellent self-dispersibility, and the stability observed when the polymer is dispersed alone is remarkably high. However, for example, the function as a so-called dispersant for stably dispersing a pigment is not high. Therefore, when the self-dispersing polymer according to the invention exists in an ink composition in a form containing the pigment, there are cases in which the stability of the entire ink composition may resultantly be greatly lowered.

The ink composition of the present invention may contain one type of resin particles alone, or may contain two or more types of resin particles.

The content of the resin particles in the ink composition of the invention is preferably from 1% by mass to 30% by mass, more preferably from 2% by mass to 20% by mass, and particularly preferably from 2% by mass to 10% by mass, with respect to the ink composition for inkjet recording, from the viewpoints of glossiness of the images and the like.

The mass ratio of the coloring material to the resin particles (coloring material/resin particles) in the ink composition of the invention is preferably from 1/0.5 to 1/10, and more preferably from 1/1 to 1/4, from the viewpoints of rub resistance of the images and the like.

Moreover, the content ratio of the colloidal silica to the resin particles (colloidal silica/resin particles) in the ink composition of the invention is preferably from 0.0001 to 0.1 on the basis of mass, and more preferably from 0.001 to 0.05.

When the content ratio of the colloidal silica to the resin particles is 0.0001 or higher, the lowering of liquid repellency of the inkjet head member may be more effectively suppressed. When the content ratio is 0.1 or lower, the ejectability may be further enhanced.

From the viewpoints of the ink ejectability, ink stability, and suppression of the lowering of liquid repellency of the inkjet head member, it is preferable that the ink composition of the invention contains resin particles having an acid value of from 20 to 200 and colloidal silica having a volume average particle diameter of from 3 nm to 50 nm, in which the content ratio thereof (colloidal silica/resin particles) is from 0.0001 to 0.1 on the basis of mass. It is more preferable that the ink composition of the invention contains resin particles having an acid value of from 22 to 120 and colloidal silica having a volume average particle diameter of from 3 nm to 25 nm, in which the content ratio thereof is from 0.001 to 0.05.

(Other Additives)

The ink composition for inkjet recording of the present invention may contain, as necessary, other additives, in addition to the above components.

Examples of the other additives in the invention include known additives such as an anti-fading agent, an emulsion stabilizer, a permeation accelerator, an ultraviolet absorber, an antiseptic agent, a mildew-proofing agent, a pH adjusting agent, a surface tension adjusting agent, an antifoaming agent, a viscosity adjusting agent, a dispersant, a dispersion stabilizer, an anti-rust agent, or a chelating agent. These various additives may be added directly after the preparation of the ink composition for inkjet recording, or may be added during the preparation of the ink composition for inkjet recording. Specific examples of the other additives include those described in paragraphs [0153] to [0162] of JP-A No. 2007-100071.

Examples of the surface tension adjusting agent include a nonionic surfactant, a cationic surfactant, an anionic surfactant, and a betaine surfactant.

In order to eject the ink composition satisfactorily by means of an inkjet method, the addition amount of the surface tension adjusting agent is preferably an addition amount that adjusts the surface tension of the ink composition to a range of from 20 mN/m to 60 mN/m, more preferably an addition amount that adjusts the surface tension of the ink composition to a range of from 20 mN/m to 45 mN/m, and even more preferably an addition amount that adjusts the surface tension of the ink composition to a range of from 25 mN/m to 40 mN/m.

The surface tension of the ink composition can be measured using, for example, a plate method at 25° C.

Preferable specific examples of the surfactant as a hydrocarbon type surfactant include anionic surfactants such as a fatty acid salt, an alkyl sulfuric acid ester salt, an alkylbenzenesulfonic acid salt, an alkylnaphthalenesulfonic acid salt, a dialkylsulfosuccinic acid salt, an alkyl phosphoric acid ester salt, a naphthalenesulfonic acid-formalin condensate, and a polyoxyethylene alkyl sulfuric acid ester salt; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester, and an oxyethylene oxypropylene block copolymer. Further, SURFYNOLS (trade name, products of Air Products & Chemicals) or OLFINE (trade name, manufactured by Nisshin Chemical Industry Co., Ltd.), which are acetylene type polyoxyethylene oxide surfactants, may also be used preferably. Furthermore, amine oxide type amphoteric surfactants, such as N,N-dimethyl-N-alkylamine oxide, and the like are also preferable.

Additionally, materials described on pages (37) and (38) of JP-A No. 59-157636 and Research Disclosure No. 308119 (1989) as surfactants can also be used.

When fluorocarbon (alkyl fluoride type) surfactants, silicone surfactants, or the like, such as those described in JP-A Nos. 2003-322926, 2004-325707 and 2004-309806 are used, rub resistance can be improved.

The surface tension adjusting agent can be used as an antifoaming agent, and a fluorine compound, a silicone compound, a chelating agent represented by EDTA (ethylenediaminetetraacetic acid), or the like can also be used.

When the application of ink is carried out by an inkjet method, the viscosity of the ink composition of the invention is preferably in a range of from 1 mPa·s to 30 mPa·s, more preferably in a range of from 1 mPa·s to 20 mPa·s, even more preferably in a range of from 2 mPa·s to 15 mPa·s, and particularly preferably in a range of from 2 mPa·s to 10 mPa·s, from the viewpoints of the droplet ejection stability and the aggregation rate.

The viscosity of the ink composition can be measured using, for example, a Brookfield Viscometer at 20° C.

The pH of the ink composition of the invention is preferably from 7.5 to 10, and more preferably from 8 to 9, from the viewpoints of the ink stability and the aggregation rate. Note that, the pH of the ink composition is measured using a conventionally used pH meter (for example, MULTI-PARAMETER WATER QUALITY METER MM-60R (trade name, manufactured by DKK-To a Corporation) at 25° C.

Further, the pH of the ink composition can be appropriately adjusted by using an acidic compound or a basic compound. As the acidic compound or the basic compound, generally used compounds can be used without any particular restriction.

<Ink Set>

The ink set of the present invention includes at least one of the ink compositions for inkjet recording described above and at least one treatment liquid which can form an aggregate when contacted with the ink composition for inkjet recording.

The ink set of the present invention is used in an image forming method of using the ink composition for inkjet recording described above, and is particularly preferable as an ink set which is used in the image forming method described below.

The ink set of the present invention can be used in the form of an ink cartridge that holds these liquids collectively or independently, which is preferable in view of the ease of handling and the like. The ink cartridge which is configured to include the ink set is known in the related technical field, and can be prepared as an ink cartridge by appropriately using a known method.

[Treatment Liquid]

The treatment liquid in the present invention is an aqueous composition which can form an aggregate when contacted with the ink composition for inkjet recording described above. Specifically, the treatment liquid in the present invention contains at least an aggregating component which is capable of forming an aggregate by aggregating dispersed particles such as the colored particles (pigment or the like) in the ink composition, when the treatment liquid is mixed with the ink composition. The treatment liquid may further contain other components, if necessary. By using the treatment liquid together with the ink composition, inkjet recording may be speeded up and, even when a high-speed recording is performed, an image having high density and high resolution may be obtained.

(Aggregating Component)

The treatment liquid contains at least one aggregating component which is capable of forming an aggregate when the treatment liquid is in contact with the ink composition. By mixing the treatment liquid with the ink composition ejected by an inkjet method, aggregation of a pigment or the like which has been stably dispersed in the ink composition is accelerated.

Examples of the treatment liquid include a liquid composition which can generate an aggregate by changing the pH of the ink composition. In this process, the pH (at 25° C.) of the treatment liquid is preferably from 1 to 6, more preferably from 1.2 to 5, and even more preferably from 1.5 to 4, from the viewpoints of the aggregation rate of the ink composition. In this case, the pH (at 25° C.) of the ink composition used in the discharging process is preferably from 7.5 to 9.5 (more preferably, from 8.0 to 9.0).

Above all, in the present invention, the case in which the pH (at 25° C.) of the ink composition is 7.5 or higher and the pH (at 25° C.) of the treatment liquid is from 3 to 5 is preferable, from the viewpoints of image density, resolution, and speeding-up of inkjet recording.

One of the aggregating components may be used alone, or two or more of the aggregating components may be used by mixing them.

The treatment liquid can be prepared by using at least one acidic compound as the aggregating component. As the acidic compound, a compound having a phosphoric acid group, a phosphonic acid group, a phosphinic acid group, a sulfuric acid group, a sulfonic acid group, a sulfinic acid group, or a carboxy group, or a salt thereof (for example, a polyvalent metal salt) may be used. Among them, from the viewpoint of the aggregation rate of the ink composition, a compound having a phosphoric acid group or a carboxy group is more preferable, and a compound having a carboxy group is even more preferable.

The compound having a carboxy group is preferably selected from the group consisting of polyacrylic acid, acetic acid, glycoric acid, malonic acid, malic acid, maleic acid, ascorbic acid, succinic acid, glutaric acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, derivatives of these compounds, salts thereof (for example, polyvalent metal salts), and the like. One of these compounds may be used alone or two or more of these compounds may be used in combination.

The treatment liquid in the present invention may further include an aqueous solvent (for example, water) in addition to the acidic compound described above.

The content of the acidic compound in the treatment liquid is preferably from 5% by mass to 95% by mass, and more preferably from 10% by mass to 80% by mass, with respect to the total mass of the treatment liquid, from the viewpoint of the aggregation effect.

As one preferable example of the treatment liquid that may improve the high speed aggregation property, a treatment liquid containing a polyvalent metal salt or a polyallyl amine or polyallylamine derivatives can be described. Examples of the polyvalent metal salt may include salts of an alkaline earth metal belonging to Group 2 of the periodic table (for example, magnesium or calcium), salts of a transition metal belonging to Group 3 of the periodic table (for example, lanthanum), salts of a cation of a metal belonging to Group 13 of the periodic table (for example, aluminum), and salts of a lanthanide (for example, neodium). As the salts of a metal, carboxylic acid salts (for example, formic acid salts, acetic acid salts, benzoic acid salts, or the like), nitric acid salts, chlorides, and thiocyanic acid salts are preferable. Among them, a calcium salt or magnesium salt of a carboxylic acid (for example, formic acid, acetic acid, benzoic acid, or the like), a calcium salt or magnesium salt of nitric acid, calcium chloride, magnesium chloride, and a calcium salt or magnesium salt of thiocyanic acid are more preferable.

The content of the metal salt in the treatment liquid is preferably from 1% by mass to 10% by mass, more preferably from 1.5% by mass to 7% by mass, and even more preferably in a range of from 2% by mass to 6% by mass.

The viscosity of the treatment liquid is preferably in a range from 1 mPa·s to 30 mPa·s, more preferably in a range from 1 mPa·s to 20 mPa·s, even more preferably in a range from 2 mPa·s to 15 mPa·s, and particularly preferably in a range from 2 mPa·s to 10 mPa·s, from the viewpoint of the aggregation rate of the ink composition. The viscosity is measured using VISCOMETER TV-22 (trade name, manufactured by TOKI SANGYO CO., LTD.) under the condition of 20° C.

Further, the surface tension of the treatment liquid is preferably from 20 mN/m to 60 mN/m, more preferably from 20 mN/m to 45 mN/m, and even more preferably from 25 mN/m to 40 mN/m, from the viewpoint of the aggregation rate of the ink composition. The surface tension is measured using AUTOMATIC SURFACE TENSIOMETER CBVP-Z (trade name, manufactured by Kyowa Interface Science Co. Ltd.) under the condition of 25° C.

<Inkjet Image Forming Method>

The inkjet image forming method of the present invention includes an ink discharging process of ejecting the ink composition for inkjet recording described above, from an inkjet head equipped with a silicone nozzle plate, onto a recording medium, to form an image. The inkjet image forming method of the invention may further include other processes, as necessary.

In the present invention, it is preferable that the inkjet image forming method further includes a treatment liquid applying process of applying a treatment liquid, which is capable of forming an aggregate when contacted with the ink composition for inkjet recording, onto the recording medium.

[Ink Discharging Process]

The ink discharging process is a process of applying the above-described ink composition for inkjet recording of the invention, from an inkjet head equipped with a silicone nozzle plate, onto a recording medium by an inkjet method. In this process, the ink composition can be selectively applied onto the recording medium, and a desired visible image can be formed. The details of the respective components in the ink composition of the present invention, preferable embodiments, and the like are as described above.

Image recording utilizing the inkjet method can be performed, specifically, by supplying energy, thereby ejecting a liquid composition to a desired recording medium, that is, plain paper, resin-coated paper, paper exclusively used for inkjet recording, which is described in, for example, JP-A Nos. 8-169172, 8-27693, 2-276670, 7-276789, 9-323475, 62-238783, 10-153989, 10-217473, 10-235995, 10-217597, and 10-337947, a film, electrophotographic common paper, fabrics, glass, metal, ceramics, or the like. As the inkjet recording method preferable for the present invention, a method described in paragraphs 0093 to 0105 of JP-A No. 2003-306623 can be applied.

The inkjet method is not particularly limited, and may be a known method. Examples thereof include a charge control system in which an ink is ejected by utilizing an electrostatic attraction force; a drop-on-demand system (pressure pulse system) in which a vibration pressure of a piezo element is utilized; an acoustic inkjet system in which an electric signal is converted into an acoustic beam and an ink is irradiated with the acoustic beam so as to be ejected by utilizing the radiation pressure; and a thermal inkjet (BUBBLE JET (registered trademark)) system in which an ink is heated to form bubbles and the resulting pressure is utilized.

It should be noted that the above inkjet method include, in its scope, a system of discharging a number of droplets of an ink having low concentration, which is referred to as a photo ink, each at a small volume; a system of improving the image quality by using plural inks which have substantially the same hue but different concentrations; and a system of using colorless and transparent ink.

Further, the inkjet head used in the inkjet method may be either an on-demand system or a continuous system. Specific examples of the ejection system may include an electric-mechanical conversion system (for example, single cavity type, double cavity type, bender type, piston type, share mode type, shared wall type, or the like), an electric-thermal conversion system (for example, thermal inkjet type, BUBBLE JET (registered trademark) type, or the like), an electrostatic attraction system (for example, electric field control type, slit jet type, or the like), and an electric discharge system (for example, spark jet type or the like), and any of the ejection systems may be used.

Ink nozzles and the like, which are used for recording by the inkjet method, are not particularly limited and may be selected as appropriate according to the purposes.

Examples of the inkjet method include a shuttle system in which a short serial head is used and recording is performed while allowing the serial head to scan in the cross direction of the recording medium, and a line system using a line head in which recording elements are arranged corresponding to the whole region for one side of a recording medium. In the line system, an image can be recorded over the whole surface of the recording medium by allowing the recording medium to scan in the direction being at right angles to the arranging direction of the recording elements, in which a transportation system such as a carriage by which the short head moves for scanning is not necessary. Further, in the line system, since complicated scanning control for the movement of the carriage and the recording medium is not necessary and only the recording medium moves, a higher recording speed can be realized as compared with the shuttle system. The inkjet recording method of the present invention is applicable to any one of them; however, in a case in which the inkjet recording method is applied to the line system in which dummy jetting is not generally carried out, the effect of improving the ejection accuracy and the rub resistance of the image may be remarkable.

Moreover, in the ink discharging process in the present invention, in the case of using a line system, recording can be appropriately performed not only using one type of the ink composition, but also using two or more types of the ink compositions, by setting the ejection (droplet ejection) interval between the first ejected ink composition (n-th color ($n \geq 1$), for example, the second color) and the subsequently ejected ink composition ((n+1)-th color, for example, the third color) at one second or less. In the present invention, by setting the ejection interval at one second or less in the line system, an image which has excellent rub resistance and in which the occurrence of blocking is suppressed can be obtained under high speed recording that is equal to or faster than that of conventional recording, while preventing bleeding caused by interference between the ink droplets or mixed of colors. Further, an image which has excellent hue and drawing properties (reproducibility of fine lines or fine portions in the image) can be obtained.

The amount of ink droplet of the ink ejected from the inkjet head is preferably from 0.5 pL (picoliter) to 6 pL, more preferably from 1 pL to 5 pL, and even more preferably from 2 pL to 4 pL, from the viewpoint of obtaining a high resolution image.

(Inkjet Head Equipped with Silicone Nozzle Plate)

The inkjet head used in the image forming method of the present invention is equipped with a nozzle plate which is formed such that at least a part thereof includes silicone. FIG. 1 is a schematic sectional diagram showing one example of an internal structure of the inkjet head.

As shown in FIG. 1, an inkjet head 100 is equipped with a nozzle plate 11 that has discharge ports (nozzles), and an ink supply unit 20 that is provided on the opposite side of the nozzle plate from the discharge direction. In the nozzle plate 11, plural discharge ports 12 that discharge ink are provided.

Figure 2:
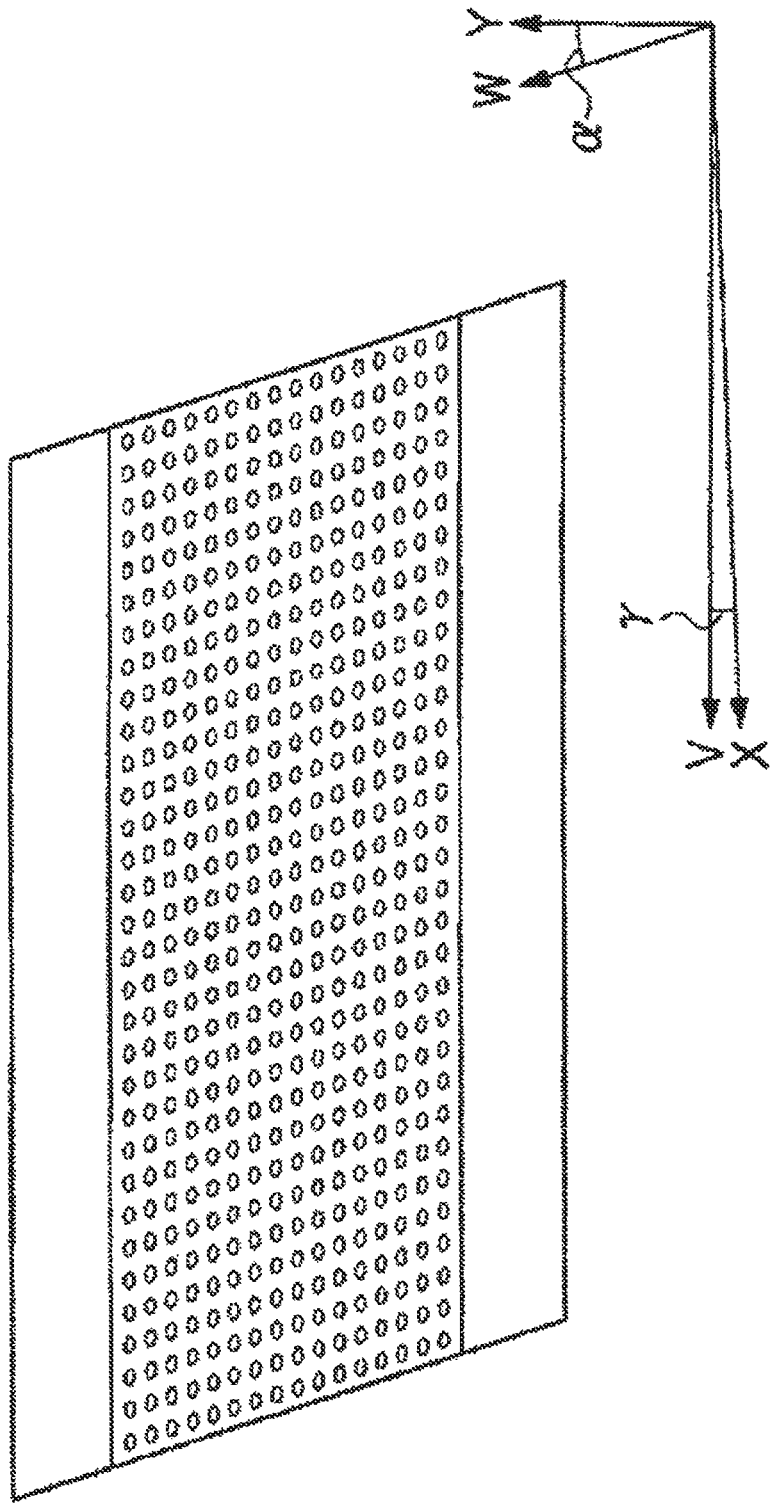
FIG. 2 is a schematic diagram showing one example of an array of discharge ports on a nozzle plate.

The nozzle plate 11 has 32×60 discharge ports (nozzles) in a two-dimensional array, as shown in FIG. 2. At least a part of this nozzle plate is formed from silicone. The nozzle plate has a structure in which silicone is exposed at the inner wall of an opening of each nozzle and at the plate surface on the ink discharge direction side. Though not shown, a liquid repellent film is provided on at least a part of the plate surface on the ink discharge direction side of the nozzle plate 11.

The ink supply unit 20 is equipped with plural pressure chambers 21, each of which communicates with each of the plural discharge ports 12 of the nozzle plate 11 through the nozzle communication path 22, plural ink supply channels 23 that supply ink to each of the plural pressure chambers 21, and a common liquid chamber 25 that supply ink to the plural ink supply channels 23, and a pressure generation unit 30 that transforms each of the plural pressure chambers 21.

The ink supply channel 23 is formed between the nozzle plate 11 and the pressure generation unit 30, such that the ink that has been supplied to the common liquid chamber 25 is introduced to the ink supply channel 23. To this ink supply channel 23, an end of a supply adjusting path 24 that is connected with the pressure chamber 21 is connected, so that ink can be introduced to the pressure chamber 21 while reducing the amount of the ink that is supplied from the ink supply channel 23 to a required amount. Plural supply adjusting paths 24 are provided at the ink supply channels 23. Ink is supplied to the pressure chamber 21 provided adjacent to the pressure generation unit 30, through the ink supply channel 23.

Thus, it is possible to supply a large amount of ink to plural discharge ports.

The pressure generation unit 30 has a configuration in which a vibration plate 31, an adhesion layer 32, a lower electrode 33, a piezoelectric body layer 34, and an upper electrode 35 are laminated in this order from the pressure chamber 21 side. Further, the pressure generation unit 30 is connected with an electric wire that supplies drive signals from the outside. When the piezoelectric element is transformed according to image signals, ink is discharged from the nozzle 12 through the nozzle communication path 22.

Furthermore, a circulation restrictor 41 is provided in the vicinity of the discharge ports 12, so that the ink is constantly recovered to a circuit 42. Thereby, increase in viscosity of an ink in the vicinity of the discharge ports during the non-ejection period can be prevented.

[Treatment Liquid Applying Process]

In the treatment liquid applying process, a treatment liquid, which is capable of forming an aggregate by contacting with the ink composition, (treatment liquid) is applied onto a recording medium, such that the treatment liquid contacts with the ink composition, thereby forming an image. In this case, dispersed particles such as the polymer particles or the coloring material (for example, pigment) in the ink composition aggregate, and an image is fixed on the recording medium. The details and preferable embodiments of the respective components in the treatment liquid are as described above.

Application of the treatment liquid may be performed in accordance with a known method such as a coating method, an inkjet method, or an immersion method. The coating may be performed by a known coating method using a bar coater, an extrusion die coater, an air doctor coater, a blade coater, a rod coater, a knife coater, a squeeze coater, a reverse roll coater, or the like. The details of the inkjet method are as described above.

The treatment liquid applying process may be provided before or after the ink discharging process using the ink composition.

In the present invention, an embodiment in which the ink discharging process is provided after the application of the treatment liquid in the treatment liquid applying process is preferable. That is, an embodiment is preferable, in which, before ejecting the ink composition on the recording medium, the treatment liquid for aggregating the coloring material (preferably, pigment) in the ink composition is applied in advance onto the recording medium, and the ink composition is ejected so as to be in contact with the treatment liquid that has been applied onto the recording medium, to form an image. Thereby, inkjet recording may be speeded up, and even when high speed recording is performed, an image having high density and high resolution may be obtained.

The amount of the treatment liquid to be applied is not particularly limited as long as the amount is enough to aggregate the ink composition. The amount of the treatment liquid to be applied is preferably such that the amount of the aggregating component (for example, a carboxylic acid having a valency of two or more or a cationic organic compound) applied is adjusted to be 0.1 g/m$^2$ or more. The amount of the treatment liquid to be applied is more preferably such that the amount of the aggregating component applied is adjusted to be from 0.1 g/m$^2$ to 1.0 g/m$^2$, and even more preferably such that the amount of the aggregating component applied is adjusted to be from 0.2 g/m$^2$ to 0.8 g/m$^2$. When the amount of the aggregating component applied is 0.1 g/m$^2$ or more, the aggregation reaction may proceed satisfactorily. When the amount of the aggregating component applied is 1.0 g/m$^2$ or less, the glossiness may not be excessively high, which is preferable.

In the present invention, it is preferable to provide the ink discharging process after the treatment liquid applying process, and to further provide a heating and drying process of heating and drying the treatment liquid on the recording medium during a period from after the application of the treatment liquid onto the recording medium to the ejection of the ink composition. Heating and drying of the treatment liquid performed in advance of the ink discharging process may realize satisfactory ink coloring properties such as bleeding prevention, and may realize recording of a visible image having satisfactory color density and satisfactory hue.

The heating and drying can be carried out by a known heating means such as a heater, a blow means utilizing air blown from a dryer or the like, or a means combining these. Examples of heating methods include a method of applying heat by a heater or the like from the opposite side of the recording medium from the surface applied with the treatment liquid, a method of blowing a warm air or hot air to the surface of the recording medium applied with the treatment liquid, and a method of heating using an infrared heater. Heating may also be performed by using two or more of these methods in combination.

[Heating and Fixing Process]

It is preferable that the inkjet recording method of the present invention includes a heating and fixing process of heating and fixing the ink image formed by the application of the ink composition by bringing the ink image into contact with a heated surface, after the ink discharging process. By performing the heating and fixing process, fixing of the image on the recording medium is achieved, and the rub resistance of the image can be further enhanced.

The heating method is not particularly limited, and preferable examples of the heating method may include methods of non-contact drying, such as a method of heating using a heating element such as a nichrome wire heater, a method of supplying a warm air or hot air, and a method of heating using a halogen lamp, an infrared lamp, or the like. The method of applying heat and pressure is not particularly limited, and preferable examples thereof include methods of performing heating and fixing by contact, such as a method of pressing a heat plate to the image-formed surface of the recording medium and a method of passing though a pair of rollers or the like, using a heating and pressing apparatus equipped with a pair of heating and pressing rollers, a pair of heating and pressing belts, or a heating and pressing belt provided on the side of the image-recorded surface of the recording medium and a holding roller provided on the opposite side thereof.

In the case of using a heating and pressing roller or a heating and pressing belt, the speed of conveyance of the recording medium is preferably in a range of from 200 mm/sec to 700 mm/sec, more preferably from 300 mm/sec to 650 mm/sec, and even more preferably from 400 mm/sec to 600 mm/sec.

[Maintenance Process]

The inkjet image forming method of the present invention may include a maintenance process of removing the ink composition or removing adhered and solidified substances derived from the ink composition, from the nozzle surface of the inkjet head.

Since the ink composition prescribed as described above is used in the image forming method of the invention, the adhered and solidified substances derived from the ink composition on the nozzle surface can be easily removed.

In the maintenance process, removal of the ink composition or the adhered and solidified substance derived from the ink composition is carried out by rubbing using a wiper blade, wiping off using cloth or papers, or the like.

Further, the maintenance process may include an operation of applying a maintenance liquid to the vicinity of the inkjet head (for example, ink channels and the like; hereinafter, also referred to as "head and the like"). When the maintenance liquid is applied to the head and the like, the adhered and solidified substances derived from ink on the nozzle surface may dissolve, or may swell or the like, thereby making the adhered and solidified substances to be removed more easily.

Application of the maintenance liquid may be performed before or after the operation of rubbing using a wiper blade, wiping off using cloth or papers, or the like. Preferably, a method of rubbing (wiping) the nozzle surface using a wiper blade after applying the maintenance liquid, thereby rubbing off the adhered and solidified substances of ink, a method of removing by wind pressure or liquid pressure of the maintenance liquid or the like, and a method of wiping off using cloth or papers are described. Among them, a method of rubbing using a wiper blade and a method of wiping off using cloth or papers are preferable.

The material of the wiper blade is preferably rubber having elasticity. Specific examples of the material include butyl rubber, chloroprene rubber, ethylene propylene rubber, silicone rubber, urethane rubber, and nitrile rubber. A wiper blade coated with a fluororesin or the like in order to impart ink repellency to the wiper blade may also be used.

—Recording Medium—

The inkjet recording method of the present invention is to record an image on a recording medium.

The recording medium is not particularly limited, and general printing paper which contains cellulose as a main component, such as so-called wood free paper, coated paper, art paper, or the like, used in general offset printing and the like, may be used. In image recording by a general inkjet method using an aqueous ink, the general printing paper containing cellulose as a main component absorbs and dries an ink relatively slowly, and therefore the coloring material is easily moved after ink droplets are spotted, resulting in easily deteriorating the image quality. However, in the inkjet recording method of the present invention, the movement of the coloring material is suppressed, thereby enabling high grade image recording with excellent color density and excellent hue.

As the recording medium, a recording medium which is generally commercially available may be used. Examples thereof include wood free paper (A) such as "OK PRINCE WOOD FREE" (trade name, manufactured by Oji Paper Co., Ltd.), "SHIORAI" (trade name, manufactured by Nippon Paper Industries Co., Ltd.), and "NEW NPI WOOD FREE" (trade name, manufactured by Nippon Paper Industries Co., Ltd.); very light-weight coated paper such as "OK EVER LITE COATED" (trade name, manufactured by Oji Paper Co., Ltd.) and "AURORA S" (trade name, manufactured by Nippon Paper Industries Co., Ltd.); light weight coated paper (A3) such as "OK COAT L" (trade name, manufactured by Oji Paper Co., Ltd.) and "AURORA L" (trade name, manufactured by Nippon Paper Industries Co., Ltd.); coated paper (A2, B2) such as "OK TOPCOAT PLUS" (trade name, manufactured by Oji Paper Co., Ltd.) and "AURORA COAT" (trade name, manufactured by Nippon Paper Industries Co., Ltd.); and art paper (A1) such as "OK KINFUJI PLUS" (trade name, manufactured by Oji Paper Co., Ltd.) and "TOKUBISHI ART" (trade name, manufactured by Mitsubishi Paper Mills, Ltd.). Further, it is also possible to use different kinds of photographic paper for inkjet recording.

Among the recording media described above, a recording medium having a water absorption coefficient Ka of from 0.05 mL/m$^2 \cdot$ms$^{1/2}$ to 0.5 mL/m$^2 \cdot$m$^{1/2}$ is preferable, a recording medium having a water absorption coefficient Ka of from 0.1 mL/m$^2 \cdot$ms$^{1/2}$ to 0.4 mL/m$^2 \cdot$ms$^{1/2}$ is more preferable, and a recording medium having a water absorption coefficient Ka of from 0.2 mL/m$^2 \cdot$ms$^{1/2}$ to 0.3 mL/m$^2 \cdot$ms$^{1/2}$ is even more preferable, from the viewpoint of obtaining large effects in suppressing the coloring material movement and obtaining a high grade image which has equal to or higher color density and equal to or better hue than those of the conventional images.

The water absorption coefficient Ka has the same definition as that described in JAPAN TAPPI PAPER PULP TEST METHOD No. 51: 2000 (published by Japan Technical Association Paper and Paper Industry), the disclosure of which is incorporated by reference herein. Specifically, the water absorption coefficient Ka is calculated from the difference between the water transfer amount at a contact time of 100 ms and the water transfer amount at a contact time of 900 ms, using an automatic scanning liquid absorptometer KM500WIN (trade name, manufactured by Kumagai Riki Kogyo Co., Ltd.).

Among the recording media, a so-called coated paper which is used in general offset printing and the like is preferable. Coated paper is prepared by providing a coat layer through coating with a coat material the surface of paper, such as wood free paper, acid free paper, or the like, which includes cellulose as a main component and has generally not been subjected to a surface treatment. The coated paper is likely to cause problems in product quality such as the gloss or rub resistance of images in the conventional image formation by aqueous inkjet. However, according to the inkjet recording method of the present invention, an image in which gloss unevenness is suppressed and which has satisfactory glossiness and satisfactory rub resistance can be obtained. Particularly, it is preferable to use a coated paper having a base paper and a coat layer containing kaolin and/or calcium bicarbonate. More specifically, an art paper, a coated paper, a light-weight coated paper, or a very light-weight coated paper is more preferable.

Exemplary embodiments of the present invention include the followings.

<1> An ink composition for inkjet recording, comprising colloidal silica, urea, a coloring material, and water.

<2> The ink composition according to the item <1>, wherein a content ratio of the urea to the colloidal silica (urea/colloidal silica) is from 5 to 1000.

<3> The ink composition according to the item <1> or the item <2>, wherein a volume average particle diameter of the colloidal silica is 20 nm or less.

<4> The ink composition according to any one of the items <1> to <3>, wherein the coloring material comprises a pigment coated with a water-insoluble resin by a phase inversion emulsification method.

<5> The ink composition according to any one of the items <1> to <4>, wherein the content of the colloidal silica is from 0.01% by mass to 3.0% by mass with respect to the total mass of the ink composition.

<6> The ink composition according to any one of the items <1> to <5>, having a pH of from 7.5 to 10.0 at 25° C.

<7> The ink composition according to any one of the items <1> to <6>, wherein the content of the urea is 1% by mass or higher but lower than 15% by mass with respect to the total mass of the ink composition.

<8> The ink composition according to any one of the items <1> to <7>, further comprising resin particles.

<9> An ink set comprising the ink composition for inkjet recording according to any one of the items <1> to <8> and a treatment liquid that forms an aggregate when contacted with the ink composition.

<10> An inkjet image forming method comprising ejecting the ink composition for inkjet recording according to any one of the items <1> to <8>, from an inkjet head equipped with a silicone nozzle plate onto a recording medium to form an image.

<11> The inkjet image forming method according to the item <10> further comprising applying a treatment liquid that forms an aggregate when contacted with the ink composition.

EXAMPLES

Hereinafter, the present invention is specifically described with reference to Examples, but the scope of the present invention is not limited to these Examples. Unless stated otherwise, the "parts" and "%" are based on mass.

In the following, weight average molecular weights were measured by gel permeation chromatography (GPC). The GPC was performed using a GPC instrument, HLC-8220GPC (trade name, manufactured by Tosoh Corporation) and three serially connected columns of TSK GEL SUPER HZM-H, TSK GEL SUPER HZ4000, and TSK GEL SUPER HZ2000 (all trade names, manufactured by Tosoh Corporation). THF (tetrahydrofuran) was used as an eluate. Regarding the GPC conditions, the sample concentration was 0.35%, the flow rate was 0.35 mL/min, the amount of sample injection was 10 μL, and the measurement temperature was 40° C. The detection was performed using an RI (refractive index) detector. The calibration curve was determined from eight standard samples, "standard sample TSK STANDARD, polystyrene": "F-40", "F-20", "F-4", "F-1", "A-5000", "A-2500", "A-1000", and "n-propylbenzene" (all trade names, manufactured by Tosoh Corporation).

<Preparation of Ink Composition for Inkjet Recording>

(Synthesis of Water-Insoluble Polymer Dispersant P-1)

88 g of methyl ethyl ketone was placed in a 1000 mL three-necked flask equipped with a stirrer and a condenser tube, and was heated to 72° C. under a nitrogen atmosphere. Then, a solution obtained by dissolving 0.85 g of dimethyl 2,2'-azobisisobutyrate, 50 g of phenoxyethyl methacrylate, 13 g of methacrylic acid, and 37 g of methyl methacrylate in 50 g of methyl ethyl ketone was added thereto dropwise over 3 hours. After the addition was completed, the mixture was further allowed to react for one hour, and then a solution obtained by dissolving 0.42 g of dimethyl 2,2'-azobisisobutyrate in 2 g of methyl ethyl ketone was added thereto. The temperature of the resulting mixture was elevated to 78° C., and the mixture was heated for 4 hours. The obtained reaction liquid was reprecipitated twice with an excess of hexane. The separated resin was dried, to obtain 96.5 g of a phenoxyethyl methacrylate/methyl methacrylate/methacrylic acid (copolymerization ratio [mass % ratio]=50/37/13) copolymer (polymer dispersant P-1).

The composition of the obtained polymer dispersant P-1 was confirmed by $^1$H-NMR, and the weight average molecular weight (Mw) determined by GPC was 49,400. Further, the acid value of the polymer was determined according to the method described in JIS (JIS K 0070: 1992, which is incorporated herein by reference) and was revealed to be 84.8 mgKOH/g.

(Preparation of Coloring Material Particle Dispersion C)

10 parts of Pigment Blue 15: 3 (trade name: PHTHALOCYANINE BLUE A220, manufactured by Dainichiseika Color & Chemicals Mfg. Co., Ltd.; cyan pigment), 4 parts of the polymer dispersant P-1 described above, 42 parts of methyl ethyl ketone, 4.4 parts of a 1 mol/L aqueous solution of NaOH (sodium hydroxide), and 87.2 parts of ion exchanged water were mixed, and dispersed for 2 hours to 6 hours using a bead mill with zirconia beads having a diameter of 0.1 mm.

From the resulting dispersion, methyl ethyl ketone was removed under a reduced pressure at 55° C., and further a portion of water was removed. Subsequently, centrifugation processing was performed for 30 minutes at 8,000 rpm using HIGH SPEED REFRIGERATED CENTRIFUGE 7550 (trade name, manufactured by Kubota Corp.) and using a 50 mL centrifuge tube, to recover the supernatant other than the precipitate. Thereafter, the pigment concentration was determined from an absorbance spectrum. In this way, coloring material particle dispersion C as a dispersion of resin-coated pigment particles (encapsulated pigment) which had a pigment concentration of 10.2% by mass was obtained.

(Preparation of Self-Dispersing Polymer Particles)

540.0 g of methyl ethyl ketone was placed in a 2 L three-necked flask equipped with a stirrer, a thermometer, a reflux condenser tube, and a nitrogen gas introduction tube, and was heated to 75° C. under a nitrogen atmosphere. While maintaining the temperature inside the reaction vessel at 75° C., a mixed solution formed from 216 g of methyl methacrylate (MMA), 280.8 g of isobornyl methacrylate (IBOMA), 43.2 g of methacrylic acid (MAA), 108 g of methyl ethyl ketone, and 2.16 g of "V-601" (trade name, manufactured by Wako Pure Chemical Industries, Ltd.) was added dropwise at a constant rate in such a manner that the addition was completed in 2 hours. After the addition was completed, a solution formed from 1.08 g of "V-601" and 15.0 g of methyl ethyl ketone was added, and the mixture was stirred at 75° C. for 2 hours. Then, a solution formed from 0.54 g of "V-601" and 15.0 g of methyl ethyl ketone was further added thereto, and the mixture was stirred for 2 hours at 75° C., and then, the temperature of the mixture was elevated to 85° C. and stirring was continued for 2 hours.

The weight average molecular weight (Mw) of the obtained copolymer was 63,000, and the acid value was 52.1 (mgKOH/g).

Next, 588.2 g of the polymerization solution was weighed, and 165 g of isopropanol and 120.8 mL of a 1 mol/L aqueous solution of NaOH were added thereto. The temperature inside the reaction vessel was elevated to 80° C. Subsequently, 718 g of distilled water was added thereto dropwise at a rate of 20 mL/min so as to disperse the resultant in water. Thereafter, under the atmospheric pressure, the temperature inside the reaction vessel was kept at 80° C. for 2 hours, then kept at 85° C. for 2 hours, and further kept at 90° C. for 2 hours to distill off the solvent. Further, the pressure inside the reaction vessel was reduced to distill off isopropanol, methyl ethyl ketone and distilled water. Thereby, a dispersion of an exemplary compound, polymer (B-02), that is, methyl methacrylate/isobornyl methacrylate/methacrylic acid copolymer (40/52/8), at a solids concentration of 26.0% was obtained.

The glass transition temperature of the obtained polymer (B-02) was measured using a differential scanning calorimeter (DSC) EXSTAR6220 (trade name, manufactured by SII Nanotechnology, Inc.), and was revealed to be 160° C.

(Preparation of Ink Composition for Inkjet Recording)

The respective components described below were mixed to give the following ink composition, using the dispersion C of resin-coated pigment particles obtained as described above, the self-dispersing polymer particles B-02, and colloidal silica (trade name: SNOWTEX XS, manufactured by Nissan Chemical Industries, Ltd.; volume average particle diameter of 5 nm). The prepared mixture was placed in a disposable syringe made of a plastic, and filtrated with PVDF (polyvinylidene difluoride) 5 μm filter (trade name: MILLEX-SV, manufactured by Millipore Corporation; diameter of 25 mm) to obtain cyan ink (ink composition for inkjet recording) C-01.

—Ink Composition—

| | |
|---|---|
| Cyan pigment (Pigment Blue 15:3) | 4% |
| Urea | 10% |
| Polymer dispersant P-1 described above (solids) | 1.6% |
| Aqueous dispersion of polymer particles (B-02) (solids) | 5% |
| Colloidal silica (solids) (trade name: SNOWTEX XS, manufactured by Nissan Chemical Industries, Ltd.; solids concentration of 20%) | 0.01% |
| SANNIX GP250 (trade name) (manufactured by Sanyo Chemical Industries, Ltd.; hydrophilic organic solvent) | 10% |
| Tripropylene glycol monomethyl ether (TPGmME) (manufactured by Wako Pure Chemical Industries, Ltd.; hydrophilic organic solvent) | 6% |
| OLFINE E1010 (trade name) (manufactured by Nissin Chemical Industry Co., Ltd.; surfactant) | 1% |
| Ion exchanged water | amount to give 100% in total |

Preparation of cyan inks C-02 to C-12 was conducted in a manner substantially similar to that in the preparation of the cyan ink C-01, except that the type and addition amount of colloidal silica and the addition amount of urea were changed as shown in Table 1.

<Preparation of Treatment Liquid (1)>

Treatment liquid (1) was prepared by mixing the respective components to give the following composition. Concerning the physical property values of the treatment liquid (1), the treatment liquid had a viscosity of 2.6 mPa·s, a surface tension of 37.3 mN/m, and a pH of 1.6 (at 25° C.).

—Composition of Treatment Liquid (1)—

| | |
|---|---|
| Malonic acid (manufactured by Wako Pure Chemical Industries, Ltd.; divalent carboxylic acid) | 15.0% |
| Diethylene glycol monomethyl ether (manufactured by Wako Pure Chemical Industries, Ltd.) | 20.0% |
| N-Oleoyl-N-methyltaurine sodium salt (surfactant) | 1.0% |
| Ion exchanged water | 64.0% |

<Image Formation and Evaluation>

An inkjet head equipped with a silicone nozzle plate as shown in FIG. 1 was prepared, and the storage tank connected to the inkjet head was refilled with the ink composition obtained as described above. Herein, a liquid repellent film was provided in advance on the silicone nozzle plate by using a fluoroalkylsilane compound. A sheet of "TOKUBISHI ART DOUBLE-SIDED N" (trade name, manufactured by Mitsubishi Paper Mills, Ltd.) that served as a recording medium was fixed on the stage that was movable in a predetermined linear direction at a velocity of 500 mm/sec. The temperature of the stage was kept at 30° C. The treatment liquid (1) obtained as described above was coated on the recording medium using a bar coater to give a thickness of about 1.2 µm, and dried at 50° C. for 2 seconds immediately after coating.

After that, a 50% solid image with a size of 2 centimeters square was printed as follows. The inkjet head was fixed and arranged such that the direction of the line head where nozzles were arranged (fast scanning direction) was inclined at an angle of 75.7 degree with respect to the perpendicular direction to the moving direction of the stage (slow scanning direction). While moving the recording medium at a constant speed along the slow scanning direction, the ink composition was ejected by a line system under the ejection conditions of an ink droplet amount of 2.4 pL, an ejection frequency of 24 kHz, and a resolution of 1200 dpi×1200 dpi.

Immediately after printing, the printed recording medium was dried at 60° C. for 3 seconds, and further passed between a pair of fixing rollers heated at 60° C. so that fixing processing was carried out at a nip pressure of 0.25 MPa and a nip width of 4 mm. In this way, a sample for evaluation was obtained.

(Ink Stability)

The temperature of each of the ink compositions for inkjet recording (Ink C-01 to Ink C-12) prepared as described above was adjusted to 25° C. Using an oscillation type viscometer (trade name: DV-II+ VISCOMETER, manufactured by BROOKFIELD), under an environment of 25° C. and 50% relative humidity, the viscosity of each of the undiluted ink compositions was measured at 25° C. using a cone plate (having a diameter of 35 mm). The average value of data obtained under the conditions in which the torque was in the range of from 20% to 90%, and the rotation frequency was in the range from 0.5 rpm to 100 rpm was determined as the measured value. The measured value immediately after the preparation was let be ink viscosity 1.

Then, a portion of each of the ink compositions for inkjet recording (Ink C-01 to Ink C-12) was placed in a sample bottle made of glass and was left stand for two weeks under an environment of 60° C. in the closed state. The viscosity of the ink after the storage was measured in a manner substantially similar to the manner described above, and the measured value after the storage was let be ink viscosity 2. Further, simultaneously, the state of the ink liquid was visually observed.

The variation rate {100−(ink viscosity 2/ink viscosity 1)×100} of the viscosities before and after the storage, which were measured as described above, was calculated. From the obtained variation rate in the ink viscosity and the results of visual observation after the storage, ink stability was evaluated according to the following evaluation criteria. The obtained results are shown in Table 1.

—Evaluation Criteria—

A: The variation rate in the ink viscosity is less than ±15%, and changes are not recognized with regard to the ink liquid.

B: The variation rate in the ink viscosity is ±15% or more but less than ±30%, and changes are not recognized with regard to the ink liquid.

C: The variation rate in the ink viscosity is ±30% or more but less than ±50%, and changes are not recognized with regard to the ink liquid.

D: The variation rate in the ink viscosity is ±50% or more, or separation or gelation is observed in the ink liquid.

(Maintenance Properties)

The ink was ejected under the following condition (1) to (3), and thereafter, the nozzle surface of the inkjet head was wiped using a wiper blade (made of a hydrogenized form of NBR (nitrile butadiene rubber)). Then, re-ejection performance was evaluated. The ink was judged whether it was a success or a failure by the results. Then, maintenance properties were evaluated according to the evaluation criteria described below. The obtained results are shown in Table 1.

(1) Just after the completion of continuous ejection for 60 minutes, blade wiping is carried out once. Then, the ink is ejected again. In a case in which the ink ejection ratio is 90% or higher, the ink is judged to be a success.

(2) After ejection for 1 minute, the ejection is stopped for 30 minutes, and then blade wiping is carried out once. Thereafter, the ink is ejected again. In a case in which the ink ejection ratio is 90% or higher, the ink is judged to be a success.

(3) Just after the completion of ejection for 10 minutes, blade wiping is carried out once. Then, the ink is ejected again. In a case in which no image unevenness is observed in the image that is formed after the maintenance operation, the ink is judged to be a success.

—Measuring Method of Ink Ejection Ratio—

At the time of the initiation of the experiment, it was confirmed that the ink was ejected from all of the nozzles. Then, after the completion of the experiment including the maintenance, the number of nozzles capable of ejecting was counted, and the ink ejection ratio was calculated according to the following equation.

Ink ejection ratio (%)=[number of nozzles capable of ejection after maintenance]/[total number of nozzles]×100(%)

—Evaluation Criteria—

A: The case in which the ink is judged to be a success in all of the three items.

B: The case in which the ink is judged to be a success in two of the items.

C: The case in which the ink is judged to be a success only in one of the items.

D: The case in which the ink is judged to be a failure in all of the three items.

(Liquid Repellency)

—Liquid Repellent Film Immersion Test—

A specimen for the liquid repellent film immersion test was prepared by forming a liquid repellent film (self assembled monolayer (SAM) film) on a silicone plate having a size of 2 cm×2 cm by using a fluoroalkylsilane compound. Using the prepared specimen, the contact angle of water with respect to the liquid repellent film was measured according to the method described below. The influence of the ink composition upon the liquid repellency of the liquid repellent film was evaluated.

30 mL of the ink composition prepared as described above was weighed and placed in a 50 mL wide-mouth bottle made of propylene (trade name: AIBOI HIROKUCHI BIN 50 mL, manufactured by Asone Corporation). Then, the above specimen was immersed in the ink composition, and maintained at 60° C. for 72 hours. Thereafter, the specimen was taken out from the bottle, washed with ultrapure water, and subjected to the measurement of the contact angle of water with respect to the surface of the liquid repellent film.

The measurement of the contact angle of water was performed by an ordinary method using ultrapure water and using a contact angle meter (trade name: DM-500, manufactured by Kyowa Interface Science Co., Ltd.) under an environment of 25° C. and 50RH %, and evaluation was made according to the following evaluation criteria.

The contact angle of water with respect to the liquid repellent film observed before immersion in the ink composition was 106.5°. The grade D in the evaluation is deemed as practically problematic.

—Evaluation Criteria—
A: The contact angle is 80° or more.
B: The contact angle is 60° or more but less than 80°.
C: The contact angle is 40° or more but less than 60°.
D: The contact angle is 20° or more but less than 40°.

allowed to stand, after which all the 96 nozzles were able to eject when 2000 ink droplets were ejected, was determined, which was used as an index for evaluating ejectability (ejection recoverability). It is thought that the ejectability is better, as the time allowed to stand, during which discharge failure does not occur, is longer. Evaluation criteria were set as follows.

It should be noted that the grade D in the evaluation is deemed as practically problematic.

—Evaluation Criteria—
A: The maximum time allowed to stand is 45 minutes or more.
B: The maximum time allowed to stand is 30 minutes or more but less than 45 minutes.
C: The maximum time allowed to stand is 20 minutes or more but less than 30 minutes.
D: The maximum time allowed to stand is less than 20 minutes.

TABLE 1

| | | Colloidal Silica | | Urea | Urea/ | Evaluation | | | |
|---|---|---|---|---|---|---|---|---|---|
| Cyan Ink | Type | Particle Diameter (nm) | Content (%) | Content (%) | Colloidal Silica | Ink Stability | Ejectability | Maintenance Properties | Liquid Repellency |
| C-01 | SNOWTEX XS | 5 | 0.01 | 10 | 1000 | A | A | B | C |
| C-02 | SNOWTEX XS | 5 | 0.03 | 7 | 233 | A | A | B | B |
| C-03 | SNOWTEX XS | 5 | 0.05 | 7 | 140 | A | A | A | A |
| C-04 | SNOWTEX XS | 5 | 0.2 | 7 | 35 | A | A | A | A |
| C-05 | SNOWTEX XS | 5 | 1 | 7 | 7 | B | B | A | A |
| C-06 | SNOWTEX XS | 5 | 0.05 | 3 | 60 | A | B | B | A |
| C-07 | SNOWTEX XS | 5 | 0.05 | 2 | 40 | A | C | B | A |
| C-08 | SNOWTEX C | 15 | 0.05 | 7 | 140 | A | B | A | B |
| C-09 | — | — | — | 7 | — | A | C | C | D |
| C-10 | — | — | — | 13 | — | B | C | C | E |
| C-11 | SNOWTEX XS | 5 | 0.01 | — | — | A | B | D | D |
| C-12 | SNOWTEX XS | 5 | 0.05 | — | — | A | C | D | A |

E: The contact angle is less than 20°.

(Ejectability)

An inkjet head equipped with a silicone nozzle plate as shown in FIG. 1 was fixed in a manner that the moving direction of the stage became perpendicular to the nozzle arrangement direction. Herein, a liquid repellent film was provided in advance on the silicone nozzle plate by using a fluoroalkylsilane compound. A storage tank connected to the inkjet head was refilled with the ink composition obtained as described above. A sheet of "KASSAI SHASHIN SHIAGE PRO" (trade name, manufactured by Fujifilm Corporation) that served as a recording medium was fixed on the stage that was movable in the direction perpendicular to the nozzle arrangement direction of the inkjet head.

Next, while moving the stage at a velocity of 248 mm/sec, ink droplets were ejected at an ink droplet amount of 3.4 pL, at an ejection frequency of 10 kHz, and at a resolution (nozzle arrangement direction x conveying direction) of 75 dpi×1200 dpi, such that 2000 ink droplets per one nozzle were ejected to print 96 lines in a direction parallel to the conveying direction, thereby preparing a printed sample. The obtained printed sample was visually observed, and it was verified that the ink was ejected from all of the nozzles.

After the ink ejection, the inkjet head was left to stand as it was for a predetermined time. Then, another sheet of the recording medium was fixed on the stage, and the ink was ejected again under the same conditions, to prepare another printed sample. The thus-obtained another printed sample was visually observed. The length of the maximum time From the above results, it is understood that the ink compositions for inkjet recording of the present invention exhibit excellent maintenance properties, and can suppress the lowering of liquid repellency of the inkjet head. Further, it is understood that the ink compositions for inkjet recording of the present invention exhibit excellent ink stability and excellent ejectability.

What is claimed is:

1. An ink composition for inkjet recording, comprising colloidal silica, urea, a pigment, and water.

2. The ink composition according to claim 1, wherein a content ratio of the urea to the colloidal silica (urea/colloidal silica) is from 5 to 1000.

3. The ink composition according to claim 1, wherein a volume average particle diameter of the colloidal silica is 20 nm or less.

4. The ink composition according to claim 1, wherein the pigment is coated with a water-insoluble resin by a phase inversion emulsification method.

5. The ink composition according to claim 1, wherein the content of the colloidal silica is from 0.01% by mass to 3.0% by mass with respect to the total mass of the ink composition.

6. The ink composition according to claim 1, having a pH of from 7.5 to 10.0 at 25° C.

7. The ink composition according to claim 1, wherein the content of the urea is 1% by mass or higher but lower than 15% by mass with respect to the total mass of the ink composition.

8. The ink composition according to claim 1, further comprising resin particles.

9. The ink composition according to claim 8, wherein the resin particles are self-dispersing polymer particles.

10. An ink set comprising the ink composition for inkjet recording according to claim 1 and a treatment liquid that forms an aggregate when contacted with the ink composition.

11. An inkjet image forming method comprising ejecting the ink composition for inkjet recording according to claim 1 from an inkjet head equipped with a silicone nozzle plate onto a recording medium to form an image.

12. The inkjet image forming method according to claim 11 further comprising applying a treatment liquid that forms an aggregate when contacted with the ink composition.

13. The inkjet image forming method according to claim 11, wherein the recording medium is a printing paper which contains cellulose as a main component.

\* \* \* \* \*